US012772110B2

(12) United States Patent
Futaki et al.

(10) Patent No.: US 12,772,110 B2
(45) Date of Patent: Oct. 20, 2026

(54) RADIO ACCESS NETWORK NODE, USER EQUIPMENT, AND METHODS THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 298 days.

(21) Appl. No.: 18/577,331

(22) PCT Filed: Apr. 27, 2022

(86) PCT No.: PCT/JP2022/019165

§ 371 (c)(1),
(2) Date: Jan. 8, 2024

(87) PCT Pub. No.: WO2023/286422

PCT Pub. Date: Jan. 19, 2023

(65) Prior Publication Data

US 2024/0388965 A1 Nov. 21, 2024

(30) Foreign Application Priority Data

Jul. 14, 2021 (JP) ................................ 2021-116353

(51) Int. Cl.
*H04W 28/086* (2023.01)

(52) U.S. Cl.
CPC .............................. *H04W 28/0861* (2023.05)

(58) Field of Classification Search
CPC ............ H04W 28/0861; H04W 92/10; H04W 92/20
See application file for complete search history.

(56) References Cited

U.S. PATENT DOCUMENTS

| | | | | |
|---|---|---|---|---|
| 10,205,582 | B2 * | 2/2019 | Qiu | H04L 5/0098 |
| 11,665,603 | B2 * | 5/2023 | Latheef | H04W 36/0058 370/331 |
| 11,924,677 | B2 * | 3/2024 | Lee | H04L 1/08 |
| 12,003,983 | B2 * | 6/2024 | Lee | H04L 5/0032 |
| 12,439,287 | B2 * | 10/2025 | Sun | H04W 24/08 |

(Continued)

FOREIGN PATENT DOCUMENTS

| | | | | |
|---|---|---|---|---|
| JP | 2017-530582 A | | 10/2017 | |
| WO | 2016/121637 A1 | | 8/2016 | |
| WO | WO-2022168767 A1 | * | 8/2022 | H04W 76/15 |

OTHER PUBLICATIONS

JP Official Communication for JP Application No. 2023-535147, mailed on Feb. 25, 2025 with English Translation.

(Continued)

*Primary Examiner* — Jael M Ulysse
(74) *Attorney, Agent, or Firm* — Sughrue Mion, PLLC

(57) ABSTRACT

In response to receiving a first signal indicating a request or indication of Secondary Cell Group (SCG) activation from a User Equipment (UE) (3) via a PSCell of the SCG, a secondary node (SN) (2) transmits a second signal indicating activation of the SCG to the UE via the PSCell. The second signal is transmitted to the UE (3) before the SN (2) sends an inter-node message indicating activation of the SCG to a master node (MN) (1) or before the SN (2) receives a response to the inter-node message from the MN (1). This can, for example, help to reduce the delay in the activation of the SCG triggered by the UE.

15 Claims, 20 Drawing Sheets

(56) References Cited

U.S. PATENT DOCUMENTS

| | | | | |
|---|---|---|---|---|
| 2017/0223763 | A1* | 8/2017 | Rahman | H04W 74/004 |
| 2022/0007256 | A1* | 1/2022 | Ozturk | H04W 36/0061 |
| 2022/0116874 | A1* | 4/2022 | Xu | H04W 52/0229 |
| 2022/0167449 | A1* | 5/2022 | Wang | H04L 5/0098 |
| 2022/0264466 | A1* | 8/2022 | Al | H04L 5/0098 |
| 2023/0189383 | A1* | 6/2023 | Liu | H04L 5/0053 370/329 |
| 2023/0292194 | A1* | 9/2023 | Da Silva | H04W 36/00698 |
| 2023/0319607 | A1* | 10/2023 | Da Silva | H04L 5/001 370/242 |
| 2023/0379992 | A1* | 11/2023 | Qiu | H04W 76/15 |
| 2023/0388882 | A1* | 11/2023 | Wang | H04W 36/0033 |
| 2023/0397273 | A1* | 12/2023 | Xu | H04W 76/15 |
| 2023/0413356 | A1* | 12/2023 | Wu | H04W 76/27 |
| 2023/0422309 | A1* | 12/2023 | Qiu | H04L 5/001 |
| 2024/0008129 | A1* | 1/2024 | Pu | H04W 72/12 |
| 2024/0056835 | A1* | 2/2024 | Centonza | H04W 24/02 |
| 2024/0056910 | A1* | 2/2024 | Eklöf | H04W 36/0061 |
| 2024/0129769 | A1* | 4/2024 | Maemoto | H04B 7/0695 |
| 2024/0237102 | A9* | 7/2024 | Wu | H04W 76/30 |
| 2024/0397379 | A1* | 11/2024 | Wager | H04W 28/086 |

OTHER PUBLICATIONS

Huawei, HiSilicon, “WF on R17 further Multi-RAT Dual-Connectivity enhancements”, 3GPP TSG RAN WG4 #102-e R4-2207006, Mar. 2, 2022, pp. 1-7.

International Search Report for PCT Application No. PCT/JP2022/019165, mailed on Aug. 9, 2022.

Vivo, “Signaling aspect of SCG activation and deactivation”, R2-2101015, 3GPP TSG-RAN WG2 Meeting #113-e, Jan. 25-Feb. 5, 2021, pp. 1-8.

Qualcomm Incorporated, “Activation of deactivated SCG”, R2-2103895, 3GPP TSG-RSN WG2 Meeting #113bis-e, Apr. 12-20, 2021, pp. 1-4.

Apple Inc, “UE initiation of SCG re-activation request”, R2-2105140, 3GPP TSG-RAN WG2 Meeting #113bis-e, Apr. 12-20, 2021, pp. 1-3.

Qualcomm Incorporated, “Potential Techniques for UE Power Saving”, 3GPP TSG RAN WG1 #96 R1-1903016, Mar. 1, 2019, pp. 1-33.

* cited by examiner

RADIO ACCESS NETWORK NODE, USER EQUIPMENT, AND METHODS THEREFOR

This application is a National Stage Entry of PCT/JP2022/019165 filed on Apr. 27, 2022, which claims priority from JP Patent Application 2021-116353 filed on Jul. 14, 2021, the contents of all of which are incorporated herein by reference, in their entirety.

TECHNICAL FIELD

The present disclosure relates to radio communication systems, and in particular to the activation and deactivation of a Secondary Cell Group (SCG) in multi-connectivity (e.g., Dual Connectivity).

BACKGROUND ART

The 3rd Generation Partnership Project (3GPP (registered trademark)) is working on Release 17. The 3GPP discusses an efficient activation and deactivation mechanism for a Secondary Cell Group (SCG). SCG deactivation enables deactivation of an SCG, including its Primary SCG Cell (PSCell).

It has been agreed in this discussion that (re-) activation of a deactivated SCG can be triggered (or initiated) by the Master Node (MN) and the Secondary Node (SN) in the case of the downlink, and by the User Equipment (UE) in the case of the uplink (see, for example, Non-Patent Literature 1-3). For UE initiated/triggered/requested SCC reactivation, two solutions are proposed: the first solution where the UE sends the SCG (re-) activation request (or indication) to the MN, and the second solution where the UE sends the SCG (re-) activation request (or indication) directly to the SN.

Specifically, in an example of a procedure according to the first solution, the UE sends an SCG (re-) activation request (or indication) to the MN, and the MN notifies the SN of the SCG (re-) activation and instructs the UE to (re-) activate the SCG (see Non-Patent Literature 1). The (re-) activation request (or indication) sent by the UE to the MN may be a Radio Resource Control (RRC) message (see Non-Patent Literature 2 and 3), for example UE Assistance Information (UAI) (see Non-Patent Literature 3). Alternatively, the (re-) activation request (or indication) may be a Buffer Status Report (BSR) (i.e., Medium Access Control (MAC) Control Element (CE)) (see Non-Patent Literature 2).

On the other hand, in an example of a procedure according to the second solution, the UE activates the SCG by performing a random access to the SN (i.e., the PSCell) (see Non-Patent Literature 1-3). If the UE maintains the valid uplink timing for the SCG, the UE may skip a random access for the SCG activation and perform an uplink transmission (see Non-Patent Literature 1). For example, the UE may send an SCG activation indication to the SCG (or SN) by sending a scheduling request (SR) (i.e., a physical layer message) in the PSCell (see Non-Patent Literature 2).

CITATION LIST

Non Patent Literature

[Non-Patent Literature 1] vivo, "Signaling aspect of SCG activation and deactivation", R2-2101015, 3GPP TSG-RAN WG2 Meeting #113-e, January 25-Feb. 5, 2021

[Non-Patent Literature 2] Qualcomm Incorporated, "Activation of deactivated SCG", R2-2103895, 3GPP TSG-RAN WG2 Meeting #113bis-e, Apr. 12-20, 2021

[Non-Patent Literature 3] Apple Inc, "UE initiation of SCG reactivation request", R2-2105140, 3GPP TSG-RAN WG2 Meeting #113bis-e, Apr. 12-20, 2021

SUMMARY OF INVENTION

Technical Problem

The inventors have studied SCG activation and deactivation and found various problems. One of these problems relates to how to perform SCG activation initiated (or triggered or requested) by the UE. In particular, it is not clear how the SN allows the UE to activate the SCG when the SN receives a request or indication (e.g., random access or SR) for SCG activation from the UE. If the SN has to exchange signaling with the MN before allowing the UE to activate the SCG, this may prevent the UE from using the SCG in a timely manner.

Another problem identified by the inventors relates to messages exchanged between the MN and the SN regarding SCG activation. In particular, when the SN sends a request or indication of SCG activation to the MN, it may be desirable for the MN to be able to recognize whether this SCG activation was triggered by the SN or the UE.

Still another problem identified by the inventors relates to the second solution for UE initiated SCG activation described above. In a specific example of the second solution, the UE activates the SCG by performing a random access to the SN (i.e., PSCell). However, if the SN needs to allocate a dedicated random access preamble to each of the UEs having their respective deactivated SCGs, this could lead to a shortage of preamble resources for Contention-Free Random Access (CFRA). On the other hand, if a random access for SCG activation is simply contention-based, this may lead to increased delay in SCG activation.

One of the objects to be accomplished by example embodiments disclosed herein is to provide apparatuses, methods, and programs that contribute to solving at least one of a plurality of problems, including the problems described above. It should be noted that this object is merely one of the objects to be achieved by the example embodiments disclosed herein. Other objects or problems and novel features will be made apparent from the following description and the accompanying drawings.

Solution to Problem

A first aspect is directed to a Radio Access Network (RAN) node configured to operate as a secondary node associated with an SCG in dual connectivity for a UE. The RAN node includes at least one memory and at least one processor coupled to the at least one memory. The at least one processor is configured to receive a first signal indicating a request or indication of activation of the SCG from the UE via a PSCell of the SCG while the SCG is deactivated. The at least one processor is configured to transmit a second signal indicating activation of the SCG to the UE via the PSCell in response to receiving the first signal. The at least one processor is further configured to send an inter-node message indicating activation of the SCG to a master node associated with a Master Cell Group (MCG) of the dual connectivity. The second signal is transmitted to the UE before the secondary node sends the inter-node message to the master node or before the secondary node receives a response to the inter-node message from the master node.

A second aspect is directed to a method performed by a RAN node configured to operate as a secondary node associated with an SCG in dual connectivity for a UE. The method includes: (a) receiving a first signal indicating a request or indication of activation of the SCG from the UE via a PSCell of the SCG while the SCG is deactivated; (b) transmitting a second signal indicating activation of the SCG to the UE via the PSCell in response to receiving the first signal; and (c) sending an inter-node message indicating activation of the SCG to a master node associated with an MCG of the dual connectivity. The second signal is transmitted to the UE before the secondary node sends the inter-node message to the master node or before the secondary node receives a response to the inter-node message from the master node.

A third aspect is directed to a RAN node configured to operate as a secondary node associated with an SCG in dual connectivity for a UE. The RAN node includes at least one memory and at least one processor coupled to the at least one memory. The at least one processor is configured to receive a first signal indicating a request or indication of activation of the SCG from the UE via a PSCell of the SCG while the SCG is deactivated. The at least one processor is configured to, in response to receiving the first signal, send an inter-node message indicating activation of the SCG to a master node associated with an MCG of the dual connectivity, and receive a response to the inter-node message from the master node. The at least one processor is configured to, if the response indicates that the activation of the SCG is accepted, transmit a second signal indicating the activation of the SCG to the UE via the PSCell.

A fourth aspect is directed to a method performed by a RAN node configured to operate as a secondary node associated with an SCG in dual connectivity for a UE. The method includes: (a) receiving a first signal indicating a request or indication of activation of the SCG from the UE via a PSCell of the SCG while the SCG is deactivated; (b) in response to receiving the first signal, sending an inter-node message indicating activation of the SCG to a master node associated with an MCG of the dual connectivity; (c) receiving a response to the inter-node message from the master node; and (d) if the response indicates that the activation of the SCG is accepted, transmitting a second signal indicating the activation of the SCG to the UE via the PSCell.

A fifth aspect is directed to a RAN node configured to operate as a secondary node associated with an SCG in dual connectivity for a UE. The RAN node includes at least one memory and at least one processor coupled to the at least one memory. The at least one processor is configured to determine which of a plurality of options is used to activate the SCG. The plurality of options are used to activate the SCG in response to receipt of a first signal indicating a request or indication of activation of the SCG from the UE via a PSCell of the SCG. The plurality of options includes a first option and a second option. The first option is an option in which the secondary node transmits a second signal indicating the activation of the SCG to the UE via the PSCell before sending an inter-node message indicating the activation of the SCG to a master node associated with an MCG of the dual connectivity. On the other hand, the second option is an option in which the secondary node transmits the second signal to the UE after receiving a response to the inter-node message from the master node.

A sixth aspect is directed to a method performed by a RAN node configured to operate as a secondary node associated with an SCG in dual connectivity for a UE. The method includes determining which of a plurality of options is used to activate the SCG. The plurality of options are used to activate the SCG in response to receipt of a first signal indicating a request or indication of activation of the SCG from the UE via a PSCell of the SCG. The plurality of options includes a first option and a second option. The first option is an option in which the secondary node transmits a second signal indicating the activation of the SCG to the UE via the PSCell before sending an inter-node message indicating the activation of the SCG to a master node associated with an MCG of the dual connectivity. On the other hand, the second option is an option in which the secondary node transmits the second signal to the UE after receiving a response to the inter-node message from the master node.

A seventh aspect is directed to a RAN node configured to operate as a master node associated with an MCG in dual connectivity for a UE. The RAN node includes at least one memory and at least one processor coupled to the at least one memory. The at least one processor is configured to determine which of a plurality of options is used to activate an SCG of the dual connectivity. The plurality of options are used to activate the SCG in response to receipt of a first signal indicating a request or indication of activation of the SCG from the UE via the MCG. The plurality of options includes a first option and a second option. The first option is an option in which the master node transmits a second signal indicating the activation of the SCG to the UE via the MCG before sending an inter-node message indicating the activation of the SCG to a secondary node associated with the SCG. On the other hand, the second option is an option in which the master node transmits the second signal to the UE after receiving a response to the inter-node message from the secondary node.

An eighth aspect is directed to a method performed by a RAN node configured to operate as a master node associated with an MCG in dual connectivity for a UE. The method includes determining which of a plurality of options is used to activate an SCG of the dual connectivity. The plurality of options are used to activate the SCG in response to receipt of a first signal indicating a request or indication of activation of the SCG from the UE via the MCG. The plurality of options includes a first option and a second option. The first option is an option in which the master node transmits a second signal indicating the activation of the SCG to the UE via the MCG before sending an inter-node message indicating the activation of the SCG to a secondary node associated with the SCG. On the other hand, the second option is an option in which the master node transmits the second signal to the UE after receiving a response to the inter-node message from the secondary node.

A ninth aspect is directed to a RAN node configured to operate as a secondary node associated with an SCG in dual connectivity for a UE. The RAN node includes at least one memory and at least one processor coupled to the at least one memory. The at least one processor is configured to receive a first signal indicating a request or indication of activation of the SCG from the UE via a PSCell of the SCG while the SCG is deactivated. The at least one processor is configured to, in response to receiving the first signal, send an inter-node message indicating a request or indication of activation of the SCG to a master node associated with an MCG of the dual connectivity. The inter-node message is identical to a message sent from the secondary node to the master node when activation of the SCG is initiated by the secondary node, but contains information indicating SCG activation initiated by the UE.

A tenth aspect is directed to a method performed by a RAN node configured to operate as a secondary node associated with an SCG in dual connectivity for a UE. The method includes: (a) receiving a first signal indicating a request or indication of activation of the SCG from the UE via a PSCell of the SCG while the SCG is deactivated; and (b) in response to receiving the first signal, sending an inter-node message indicating a request or indication of activation of the SCG to a master node associated with an MCG of the dual connectivity. The inter-node message is identical to a message sent from the secondary node to the master node when activation of the SCG is initiated by the secondary node, but contains information indicating SCG activation initiated by the UE.

An eleventh aspect is directed to a RAN node configured to operate as a master node associated with an MCG in dual connectivity for a UE. The RAN node includes at least one memory and at least one processor coupled to the at least one memory. The at least one processor is configured to, while an SCG of the dual connectivity is deactivated, receive a first signal indicating a request or indication of activation of the SCG from the UE via the MCG. The at least one processor is configured to, in response to receiving the first signal, send an inter-node message indicating a request or indication of activation of the SCG to a secondary node associated with the SCG. The inter-node message is identical to a message sent from the master node to the secondary node when activation of the SCG is initiated by the master node, but contains information indicating SCG activation initiated by the UE.

A twelfth aspect is directed to a method performed by a RAN node configured to operate as a master node associated with an MCG in dual connectivity for a UE. The method includes: (a) while an SCG of the dual connectivity is deactivated, receiving a first signal indicating a request or indication of activation of the SCG from the UE via the MCG; and (b) in response to receiving the first signal, sending an inter-node message indicating a request or indication of activation of the SCG to a secondary node associated with the SCG. The inter-node message is identical to a message sent from the master node to the secondary node when activation of the SCG is initiated by the master node, but contains information indicating SCG activation initiated by the UE.

A thirteenth aspect is directed to a RAN node configured to operate as a secondary node associated with an SCG in dual connectivity for a UE. The RAN node includes at least one memory and at least one processor coupled to the at least one memory. The at least one processor is configured to receive a first signal indicating a request or indication of activation of the SCG from the UE via a PSCell of the SCG while the SCG is deactivated. The at least one processor is configured to, in response to receiving the first signal, send an inter-node message indicating a request or indication of activation of the SCG to a master node associated with an MCG of the dual connectivity. The inter-node message contains information indicating which of first and second options is used to activate the SCG. The first option is an option in which the secondary node transmits a second signal indicating the activation of the SCG to the UE via the PSCell before sending the inter-node message to the master node. On the other hand, the second option is an option in which the secondary node transmits the second signal to the UE after receiving a response to the inter-node message from the master node.

A fourteenth aspect is directed to a method performed by a RAN node configured to operate as a secondary node associated with an SCG in dual connectivity for a UE. The method includes: (a) receiving a first signal indicating a request or indication of activation of the SCG from the UE via a PSCell of the SCG while the SCG is deactivated; and (b) in response to receiving the first signal, sending an inter-node message indicating a request or indication of activation of the SCG to a master node associated with an MCG of the dual connectivity. The inter-node message contains information indicating which of first and second options is used to activate the SCG. The first option is an option in which the secondary node transmits a second signal indicating the activation of the SCG to the UE via the PSCell before sending the inter-node message to the master node. On the other hand, the second option is an option in which the secondary node transmits the second signal to the UE after receiving a response to the inter-node message from the master node.

A fifteenth aspect is directed to a RAN node configured to operate as a master node associated with an MCG in dual connectivity for a UE. The RAN node includes at least one memory and at least one processor coupled to the at least one memory. The at least one processor is configured to, while an SCG of the dual connectivity is deactivated, receive a first signal indicating a request or indication of activation of the SCG from the UE via the MCG. The at least one processor is configured to, in response to receiving the first signal, send an inter-node message indicating a request or indication of activation of the SCG to a secondary node associated with the SCG. The inter-node message contains information indicating which of first and second options is used to activate the SCG. The first option is an option in which the master node transmits a second signal indicating the activation of the SCG to the UE via the MCG before sending the inter-node message to the secondary node. On the other hand, the second option is an option in which the master node transmits the second signal to the UE after receiving a response to the inter-node message from the secondary node.

A sixteenth aspect is directed to a method performed by a RAN node configured to operate as a master node associated with an MCG in dual connectivity for a UE. The method includes: (a) while an SCG of the dual connectivity is deactivated, receiving a first signal indicating a request or indication of activation of the SCG from the UE via the MCG; and (b) in response to receiving the first signal, sending an inter-node message indicating a request or indication of activation of the SCG to a secondary node associated with the SCG. The inter-node message contains information indicating which of first and second options is used to activate the SCG. The first option is an option in which the master node transmits a second signal indicating the activation of the SCG to the UE via the MCG before sending the inter-node message to the secondary node. On the other hand, the second option is an option in which the master node transmits the second signal to the UE after receiving a response to the inter-node message from the secondary node.

A seventeenth aspect is directed to a RAN node configured to operate as a secondary node associated with an SCG in dual connectivity for a UE. The RAN node includes at least one memory and at least one processor coupled to the at least one memory. The at least one processor is configured to configure the UE with a random access preamble pool dedicated to SCG activation. The random access preamble pool is used by one or more UEs to perform a contention-based random access to a PSCell of the SCG for SCG activation.

An eighteenth aspect is directed to a method performed by a RAN node configured to operate as a secondary node associated with an SCG in dual connectivity for a UE. The method includes configuring the UE with a random access preamble pool dedicated to SCG activation. The random access preamble pool is used by one or more UEs to perform a contention-based random access to a PSCell of the SCG for SCG activation.

A nineteenth aspect is directed to a UE configured to support dual connectivity using an MCG associated with a master node and an SCG associated with a secondary node. The UE includes at least one memory and at least one processor coupled to the at least one memory. The at least one processor is configured to receive from the secondary node a configuration of a random access preamble pool dedicated to SCG activation. The at least one processor is configured to select a preamble from the random access preamble pool to perform a contention-based random access to a PSCell of the SCG to activate the SCG.

A twentieth aspect is directed to a method performed by a UE configured to support dual connectivity using an MCG associated with a master node and an SCG associated with a secondary node. The method includes: (a) receiving from the secondary node a configuration of a random access preamble pool dedicated to SCG activation; and (b) selecting a preamble from the random access preamble pool to perform a contention-based random access to a PSCell of the SCG to activate the SCG.

A twenty-first aspect is directed to a RAN node configured to operate as a secondary node associated with an SCG in dual connectivity for a UE. The RAN node includes at least one memory and at least one processor coupled to the at least one memory. The at least one processor is configured to transmit a random access prioritization configuration to the UE if the SCG is currently deactivated or to be deactivated. The random access prioritization configuration causes the UE to set a power ramping factor or a scaling factor for a backoff indicator, or both, to a value indicated by the random access prioritization configuration, if a random access procedure is initiated to activate the SCG and the random access prioritization configuration has been configured in the UE by the secondary node.

A twenty-second aspect is directed to a method performed by a RAN node configured to operate as a secondary node associated with an SCG in dual connectivity for a UE. The method includes transmitting a random access prioritization configuration to the UE if the SCG is currently deactivated or to be deactivated. The random access prioritization configuration causes the UE to set a power ramping factor or a scaling factor for a backoff indicator, or both, to a value indicated by the random access prioritization configuration, if a random access procedure is initiated to activate the SCG and the random access prioritization configuration has been configured in the UE by the secondary node.

A twenty-third aspect is directed to a UE configured to support dual connectivity using an MCG associated with a master node and an SCG associated with a secondary node. The UE includes at least one memory and at least one processor coupled to the at least one memory. The at least one processor is configured to, if a random access procedure is initiated to activate the SCG and a random access prioritization configuration has been configured in the UE by the secondary node, set a power ramping factor or a scaling factor for a backoff indicator, or both, to a value indicated by the random access prioritization configuration. The at least one processor is configured to perform a random access to a Primary SCG Cell (PSCell) of the SCG.

A twenty-fourth aspect is directed to a method performed by a UE configured to support dual connectivity using an MCG associated with a master node and an SCG associated with a secondary node. The method includes: (a) if a random access procedure is initiated to activate the SCG and a random access prioritization configuration has been configured in the UE by the secondary node, setting a power ramping factor or a scaling factor for a backoff indicator, or both, to a value indicated by the random access prioritization configuration; and (b) performing a random access to a Primary SCG Cell (PSCell) of the SCG.

A twenty-fifth aspect is directed to a program. The program includes a set of instructions (software codes) that, when loaded into a computer, cause the computer to perform the method according to the second, fourth, sixth, eighth, tenth, twelfth, fourteenth, sixteenth, eighteenth, twentieth, twenty-second, or twenty-fourth aspect described above.

Advantageous Effects of Invention

According to the aspects described above, it is possible to provide apparatuses, methods and programs that contribute to solving at least one of a plurality of problems related to SCG activation and deactivation, including the problems described above.

EXAMPLE EMBODIMENT

Specific example embodiments will be described hereinafter in detail with reference to the drawings. The same or corresponding elements are denoted by the same symbols throughout the drawings, and duplicated explanations are omitted as necessary for the sake of clarity.

Each of the example embodiments described below may be used individually, or two or more of the example embodiments may be appropriately combined with one another. These example embodiments include novel features different from each other. Accordingly, these example embodiments contribute to attaining objects or solving problems different from one another and contribute to obtaining advantages different from one another.

The example embodiments presented below are primarily described for the 3GPP Long Term Evolution (LTE) system and the 5th generation mobile communication system (5G system). However, these example embodiments can be applied to other radio communication systems that support technologies similar to 3GPP multi-connectivity (e.g., Dual Connectivity). The term LTE as used in this specification includes enhancements and developments of LTE and LTE-Advanced to enable interworking with the 5G system, unless otherwise noted.

As used in this specification, "if" can be interpreted to mean "when", "at or around the time", "after", "upon", "in response to determining", "in accordance with a determination", or "in response to detecting", depending on the context.

First Example Embodiment

Figure 1:
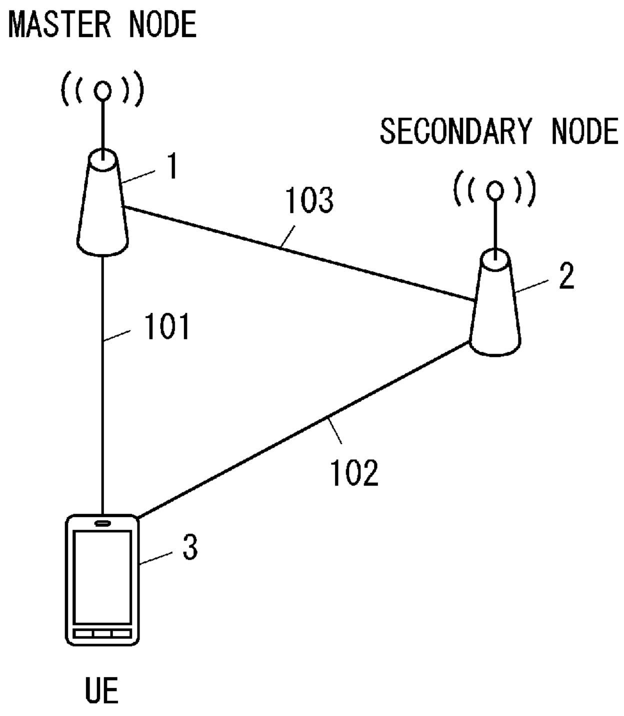
FIG. 1 shows an example configuration of a radio communication network according to an example embodiment.

FIG. 1 shows an example configuration of a radio communication network according to a plurality of example embodiments including this example embodiment. In the example of FIG. 1, the radio communication network includes a RAN node 1, a RAN node 2, and a UE 3. Each element (or network function) shown in FIG. 1 can be implemented, for example, as a network element on dedicated hardware, as a software instance running on dedicated hardware, or as a virtualized function instantiated on an application platform.

The RAN node 1 may be a Central Unit (e.g., eNB-CU or gNB-CU) in a Cloud RAN (C-RAN) deployment, or a combination of a CU and one or more Distributed Units (e.g., eNB-DUs or gNB-DUs). The C-RAN is also referred to as a CU/DU split. The CU may include a Control Plane (CP) Unit (e.g., gNB-CU-CP) and one or more User Plane (UP) Units (e.g., gNB-CU-UPs). Accordingly, the RAN node 1 may be a CU-CP or a combination of a CU-CP and a CU-UP(s). Similarly, the RAN node 2 may be a CU or a combination of a CU and one or more DUs. The RAN node 2 may be a CU-CP or a combination of a CU-CP and a CU-UP(s).

Each of the RAN nodes 1 and 2 may be an Evolved Universal Mobile Telecommunications System (UMTS) Terrestrial Radio Access Network (EUTRAN) node or a Next Generation Radio Access Network (NG-RAN) node. The EUTRAN node may be an eNB or an en-gNB. The NG-RAN node may be a gNB or an ng-eNB. The en-gNB is a node that provides NR user plane and control plane protocol terminations towards a UE and acts as a Secondary Node (SN) in E-UTRA-NR Dual Connectivity (EN-DC). The ng-eNB is a node that provides E-UTRA user plane and control plane protocol terminations towards a UE and is connected to a 5GC via an NG interface. The Radio Access Technology (RAT) of the RAN node 1 may be different from that of the RAN node 2.

The RAN node 1 and the RAN node 2 communicate with each other via an inter-node interface (i.e., X2 interface or Xn interface) 103. The RAN node 1 and the RAN node 2 operate as a Master Node (MN) and a Secondary Node (SN), respectively, in dual connectivity. In the following, the RAN node 1 may be referred to as MN 1, and the RAN node 2 may be referred to as SN 2. The UE 3 communicates with the MN 1 and the SN 2 via air interfaces 101 and 102, and performs dual connectivity of a Master Cell Group (MCG) and a Secondary Cell Group (SCG).

This dual connectivity may be Multi-Radio Dual Connectivity (MR-DC). The MR-DC includes E-UTRA-NR Dual Connectivity (EN-DC), NG-RAN E-UTRA-NR Dual Connectivity (NGEN-DC), NR-E-UTRA Dual Connectivity (NE-DC), and NR-NR Dual Connectivity (NR-DC). Accordingly, the MN 1 may be one of a Master eNB (in EN-DC), a Master ng-eNB (in NGEN-DC), and a Master gNB (in NR-DC and NE-DC). Similarly, the SN 2 may be one of an en-gNB (in EN-DC), a Secondary ng-eNB (in NE-DC), and a Secondary gNB (in NR-DC and NGEN-DC). In EN-DC, the UE 3 is connected to an eNB acting as the MN 1 and to an en-gNB acting as the SN 2. In NGEN-DC, the UE 3 is connected to an ng-eNB acting as the MN 1 and to a gNB acting as the SN 2. In NE-DC, the UE 3 is connected to a gNB acting as the MN 1 and to an ng-eNB acting as the SN 2. In NR-DC, the UE 3 is connected to one gNB (or gNB-DU) acting as the MN 1 and to another gNB (or gNB-DU) acting as the SN 2.

The MCG is a group of serving cells associated with (or provided by) the MN 1, including the SpCell (i.e., Primary Cell (PCell)) and optionally one or more Secondary Cells (SCells). Meanwhile, the SCG is a group of serving cells associated with (or provided by) the SN 2 and includes the Primary SCG Cell (PSCell) and optionally one or more Secondary Cells (SCells). The PSCell is the Special Cell (SpCell) of the SCG and supports Physical Uplink Control Channel (PUCCH) transmission and contention-based random access. In LTE (e.g., LTE-DC and NE-DC), PSCell may be an abbreviation of Primary SCell.

As used in the present specification, the term "primary SCG cell" and its abbreviation "PSCell" stands for a cell that is included in a cell group provided by an SN in dual connectivity, has an uplink component carrier, and is configured with uplink control channel (e.g., PUCCH) resources. Specifically, the term "primary SCG cell" and its abbreviation "PSCell" may refer to a Primary SCG Cell of a cell group provided by an SN (e.g., en-gNB in EN-DC, gNB in NGEN-DC, or gNB in NR-DC) supporting 5G NR, or may refer to a Primary SCell of a cell group provided by an SN (e.g., eNB in LTE DC, or ng-eNB in NE-DC) supporting E-UTRA.

Figure 2:
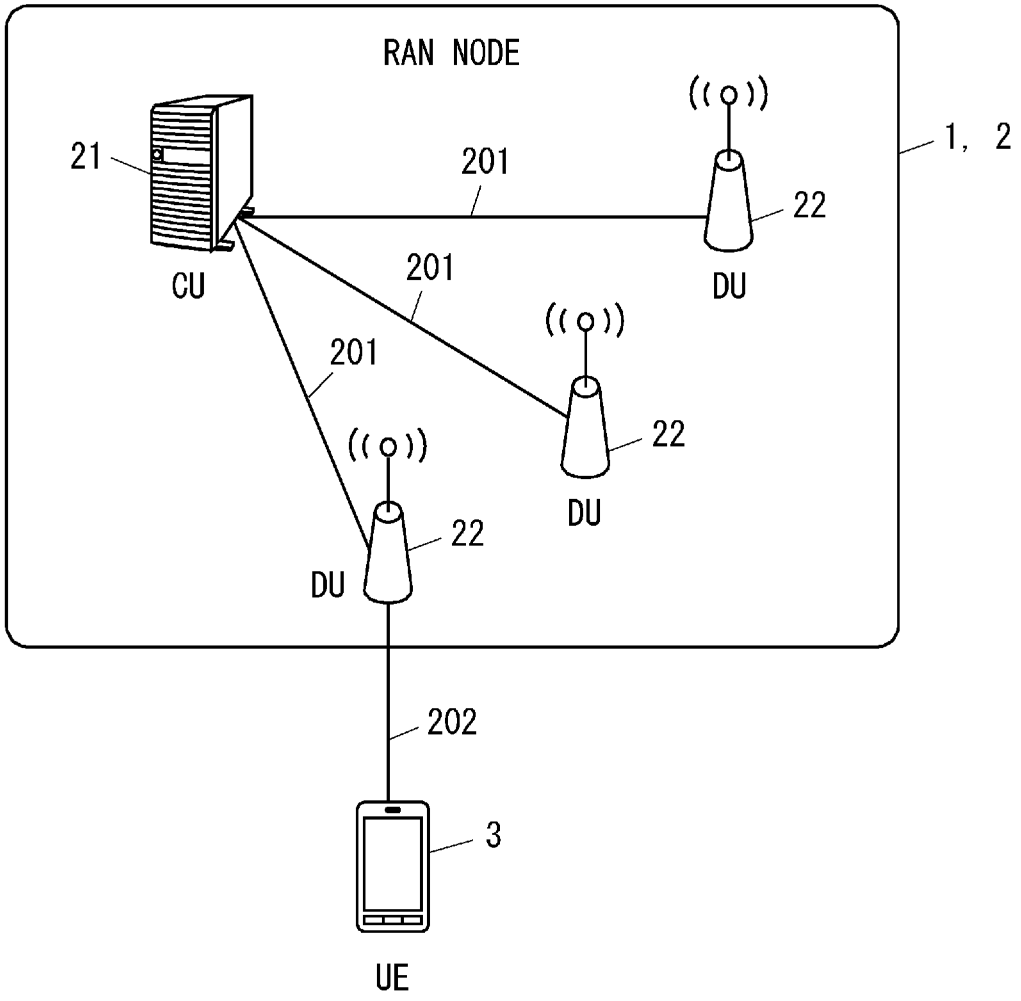
FIG. 2 shows an example configuration of a RAN node according to an example embodiment.

One or both of the MN 1 and the SN 2 may have the configuration shown in FIG. 2. Each element (network function) shown in FIG. 2 can be implemented, for example, as a network element on dedicated hardware, as a software instance running on dedicated hardware, or as a virtualized function instantiated on an application platform. One or both of the RAN nodes 1 and 2 may include, but are not limited to, a CU 21 and one or more DUs 22 as shown in FIG. 2. The CU 21 is connected to each DU 22 via an interface 201. The UE 3 is connected to at least one DU 22 via at least one air interface 202.

The CU 21 may be a logical node that hosts Radio Resource Control (RRC), Service Data Adaptation Protocol (SDAP), and Packet Data Convergence Protocol (PDCP) protocols of the gNB (or hosts the RRC and PDCP protocols of the gNB). The DU 22 may be a logical node that hosts Radio Link Control (RLC), Medium Access Control (MAC), and Physical (PHY) layers of the gNB. If the CU 21 is a gNB-CU and the DUs 22 are gNB-DUs, then the interfaces 201 may be F1 interfaces. The CU 21 may include a CU-CP and a CU-UP(s).

Figure 3:
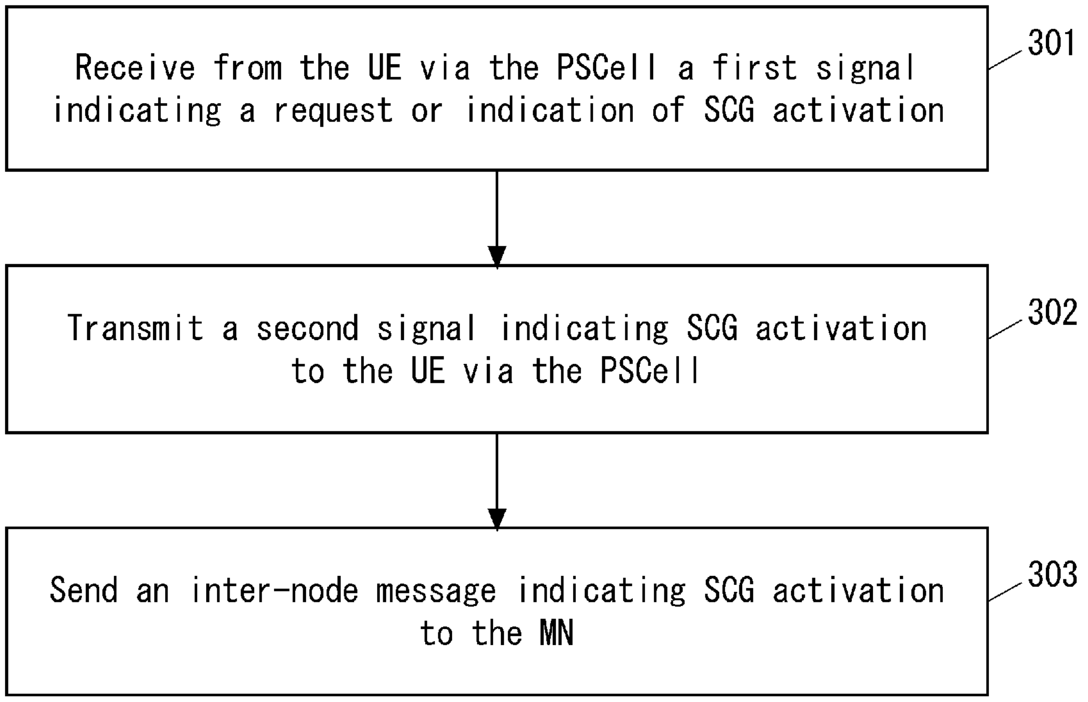
FIG. 3 is a flowchart showing an example of a process performed by a secondary node according to an example embodiment.

The following describes the operation of the MN 1, the SN 2, and the UE 3 in relation to the activation of the SCG associated with SN 2. In this and subsequent example embodiments, SCG activation and deactivation may be referred to as SCG resume and suspend, respectively. FIG. 3 shows an example of the operation of the SN 2. In step 301, while the SCG is deactivated, the SN 2 receives from the UE 3 via the PSCell a first signal indicating a request or indication of SCG activation. The first signal informs the SN 2 that the SCG needs to be activated. For example, if uplink data to be transmitted on the SCG occurs while the SCG is deactivated, the UE 3 may transmit the first signal. In other words, if uplink data to be transmitted on a Data Radio Bearer (DRB) using SCG resources has arrived, the UE 3 may transmit the first signal. The DRB may be an SCG DRB (or SCG bearer) or a split DRB (or split bearer). The SCG DRB is a DRB that has an RLC bearer only in the SCG associated with the SN 2. On the other hand, the split DRB is a DRB that has both an RLC bearer in the MCG associated with the MN 1 and an RLC bearer in the SCG. The SCG DRB and the split DRB may be SN terminated bearers terminated by the SN 2 or MN terminated bearers terminated by the MN 1. An SN terminated bearer is a radio bearer for which the PDCP is located in the SN 2. An MN terminated bearer is a radio bearer for which the PDCP is located in the MN 1. In addition, the fact that the primary path of the split DRB is set to the SCG may be considered as a condition for the UE 3 to transmit the first signal. Alternatively, if the UE 3 has detected a Radio Link Failure (RLF) in the MCG, the UE 3 may transmit the first signal.

As already described, the UE 3 may activate the SCG by performing a random access to the SN 2 (i.e., the PSCell). If the UE 3 maintains the valid uplink timing for the SCG, the UE 3 may skip a random access for the SCG activation and perform an uplink transmission. For example, the UE 3 may send an SCG activation indication to the SN 2 by sending a scheduling request (SR) (i.e., a physical layer message) in the PSCell. Thus, the SN 2 may receive the first signal of step 301 via a random access to the PSCell or via an uplink physical layer message. In other words, the first signal may be or be included in a signal or data (e.g., random access preamble) transmitted by the UE 3 in a random access. Alternatively, the first signal may be or be included in the SR, Uplink Control Information (UCI) indicating the SR, or a physical channel carrying the UCI (e.g., Physical Uplink Control Channel (PUCCH)).

In step 302, in response to receiving the first signal, the SN 2 transmits a second signal indicating SCG activation to the UE 3 via the PSCell. In step 303, the SN 2 sends an inter-node message (e.g., X2 message, Xn message, or inter-node RRC message) indicating SCG activation to the MN 1. The second signal (302) is sent to the UE 3 before the SN 2 sends the inter-node message (303) to the MN 1 or before the SN 2 receives a response to the inter-node message (303) from the MN 1. In other words, when the SN 2 activates the SCG in response to a request from the UE 3, the SN 2 allows the UE 3 to activate the SCG (or perform an uplink transmission in a DRB using SCG resources) without waiting for confirmation (or acceptance) from the MN 1. This can help to reduce the delay in SCG activation. Preferably, the SN 2 may send the second signal (302) to the UE 3 before sending the inter-node message (303) to the MN 1. In other words, when the SN 2 activates the SCG in response to a request from the UE 3, the SN 2 may avoid signaling with the MN 1 before allowing the UE 3 to perform the SCG activation.

The second signal (302) may explicitly or implicitly indicate SCG activation to the UE 3. The SN 2 may send the second signal to the UE 3 via a random access procedure or via a downlink physical layer message. The second signal may be or be included in a signal or data (e.g., random access response) sent from the SN 2 to the UE 3 in the random access procedure. Alternatively, the second signal may be or be included in an uplink grant, Downlink Control Information (DCI) indicating the uplink grant, or a physical channel (e.g., Physical Downlink Control Channel (PDCCH)) carrying the DCI. Additionally or alternatively, the second signal may be or be included in a downlink signal (e.g., MAC CE, PDCCH) transmitted after the random access procedure. The second signal indicating SCG activation may indicate acceptance of the SCG activation request.

The inter-node message (303) may contain information indicating that the SCG has already been activated and/or that the SCG activation has been indicated to the UE 3. The inter-node message (303) may be sent to inform the MN 1 of the SCG activation initiated (or triggered, requested) by the UE 3. The inter-node message (303) may be identical to the message sent from the SN 2 to the MN 1 when the SCG activation is initiated (or triggered) by the SN 2, but may contain information that explicitly or implicitly indicates a UE-initiated (or triggered, requested) SCG activation. By receiving the inter-node message (303) indicating such information, the MN 1 can know that the SCG activation has been triggered by the UE 3. In other words, the MN 1 can identify whether the SCG activation was triggered by the SN 2 or the UE 3. Alternatively, the MN 1 can know that the SCG has already been activated based on a request from the UE 3.

Figure 4:
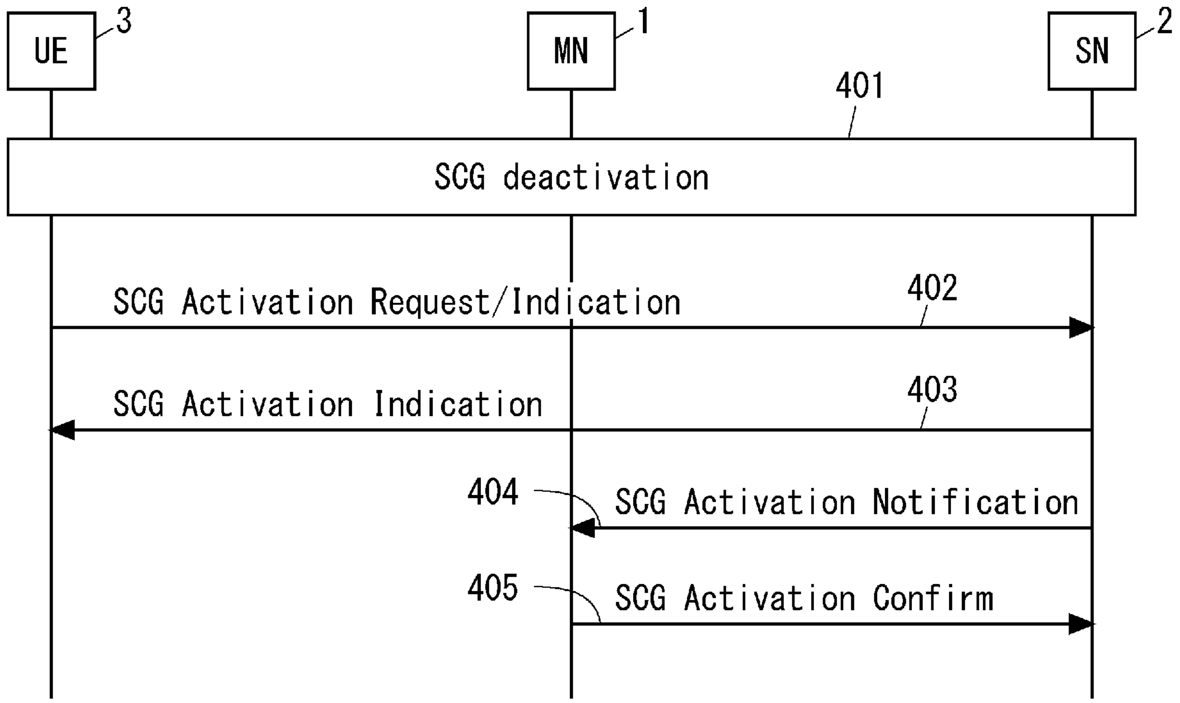
FIG. 4 is a sequence diagram showing an example of a process performed by a master node, a secondary node, and a UE according to an example embodiment.

FIG. 4 shows an example of the operation of the MN 1, SN 2, and UE 3. In step 401, the SCG provided by the SN 2 to the UE 3 is deactivated. The SCG deactivation in step 401 can be initiated, triggered, or requested by the MN 1, the SN 2, or the UE 3. As an example, and not a limitation, the SCG deactivation in step 401 may be performed according to any of the multiple options described in Non-Patent Literature 1, clause 2.3.1.

In step 402, the UE 3 sends an SCG activation request (or indication) to the SN 2 in the PSCell. Step 402 corresponds to step 301 in FIG. 3. In step 403, the SN 2 sends an SCG activation indication (or notification) to the UE 3 in the PSCell. Step 403 corresponds to step 302 in FIG. 3. In step 404, the SN 2 sends an inter-node message containing an SCG activation indication (or notification) to the MN 1. The inter-node message may be an SGNB MODIFICATION REQUIRED message, an S-NODE MODIFICATION REQUIRED message, or an RRC TRANSFER message containing an inter-node RRC message. Step 404 corresponds to step 303 in FIG. 3.

In step 405, the MN 1 sends to the SN 2 an inter-node message indicating confirmation (or acceptance) of the SCG activation. The inter-node message may be an SGNB MODIFICATION CONFIRM message, an S-NODE MODIFICATION CONFIRM message, or an RRC TRANSFER message containing an inter-node RRC message. In some implementations, step 405 may be omitted. Alternatively, the transmission of step 403 may occur between steps 404 and 405. In other words, the SN 2 may send the SCG activation indication (or notification) to the UE 3 after sending (404) the SCG activation indication (or notification) to the MN 1 and before receiving (405) the response from the MN 1.

Second Example Embodiment

The example configuration of a radio communication network according to this example embodiment is the same as the examples shown in FIG. 1 and FIG. 2. The following describes the operation of the MN 1, the SN 2, and the UE 3 in relation to the activation of the SCG associated with the SN 2.

Figure 5:
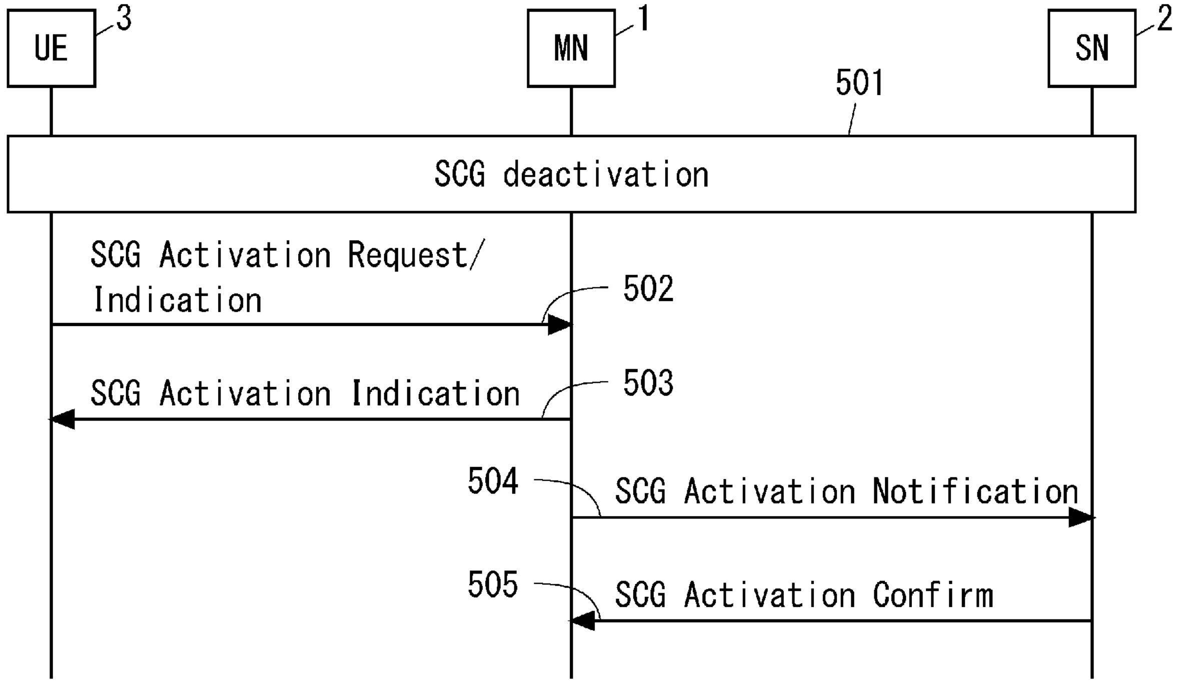
FIG. 5 is a sequence diagram showing an example of a process performed by a master node, a secondary node, and a UE according to an example embodiment.

FIG. 5 shows an example of the operation of the MN 1, SN 2, and UE 3. In step 501, the SCG provided by the SN 2 to the UE 3 is deactivated. The SCG deactivation in step 501 can be initiated, triggered, or requested by the MN 1, the SN 2, or the UE 3.

In step 502, the UE 3 sends an SCG activation request (or indication) to the MN 1 via the MCG (e.g., PCell). The SCG activation request (or indication) sent by the UE 3 to the MN 1 may be an MN RRC message, e.g., UE Assistance Information (UAI). Alternatively, the activation request (or indication) may be a Buffer Status Report (BSR) (i.e., Medium Access Control (MAC) Control Element (CE)). In step 503, the MN 1 transmits an SCG activation indication (or notification) to the UE 3 via the MCG. The SCG activation indication (or notification) in step 503 may be sent to the UE 3 via an MN RRC message, MAC CE, or DCI.

In step 504, the MN 1 sends an inter-node message (e.g., X2 message, Xn message, or inter-node RRC message) containing an SCG activation indication (or notification) to the SN 2. The inter-node message may be an SGNB MODIFICATION REQUEST message, an S-NODE MODIFICATION REQUEST message, or an RRC TRANSFER message containing an inter-node RRC message. In step 505, the SN 2 sends to the MN 1 an inter-node message indicating confirmation (or acceptance) of the SCG activation. The inter-node message may be an SGNB MODIFICATION REQUEST ACKNOWLEDGE message, an S-NODE MODIFICATION REQUEST ACKNOWLEDGE message, or an RRC TRANSFER message containing an inter-node RRC message. In some implementations, step 505 may be omitted. Alternatively, the transmission of step 503 may occur between steps 504 and 505. In other words, the MN 1 may transmit the SCG activation indication (or notification) to the UE 3 after sending (504) the SCG activation indication (or notification) to the SN 2 and before receiving (505) the response from the SN 2.

That is, according to the procedure in FIG. 5, when the MN 1 activates the SCG in response to a request from the UE 3, the MN 1 allows the UE 3 to activate the SCG without waiting for confirmation (or acceptance) from the SN 2. This can help to reduce the delay in SCG activation. Preferably, the MN 1 may send the SCG activation indication (or notification) (503) to the UE 3 before sending the inter-node message (504) to the SN 2.

Third Example Embodiment

The example configuration of a radio communication network according to this example embodiment is the same as the examples shown in FIG. 1 and FIG. 2. The following describes the operation of the MN 1, the SN 2, and the UE 3 in relation to the activation of the SCG associated with the SN 2.

Figure 6:
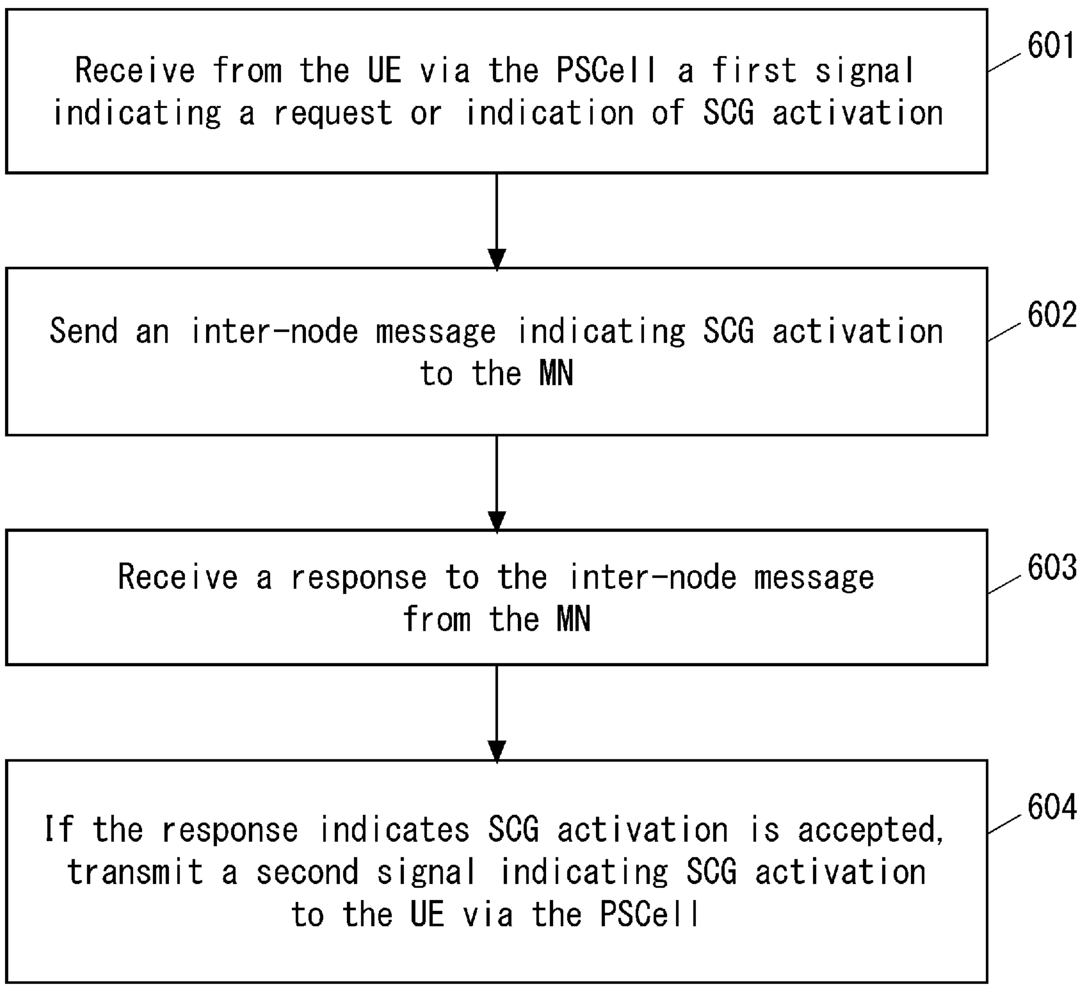
FIG. 6 is a flowchart showing an example of a process performed by a secondary node according to an example embodiment.

FIG. 6 shows an example of the operation of the SN 2. Step 601 is similar to step 301 in FIG. 3. Specifically, in step 601, while the SCG is deactivated, the SN 2 receives from the UE 3 via the PSCell a first signal indicating a request or indication of SCG activation. The first signal informs the SN 2 that the SCG needs to be activated. The SN 2 may receive the first signal of step 601 via a random access to the PSCell or via an uplink physical layer message. In other words, the first signal may be or be included in a signal or data (e.g., random access preamble) transmitted by the UE 3 in a random access. Alternatively, the first signal may be or be included in an SR, Uplink Control Information (UCI) indicating the SR, or a physical channel carrying the UCI (e.g., PUCCH).

In step 602, the SN 2 sends an inter-node message (e.g., X2 message, Xn message, or inter-node RRC message) indicating SCG activation to the MN 1. In step 603, the SN 2 receives from the MN 1 an inter-node message indicating a response to the message of step 302. In step 604, if the response from the MN 1 indicates that the SCG activation is accepted, the SN 2 sends a second signal indicating the SCG activation to the UE 3 via the PSCell.

According to the procedure shown in FIG. 6, when the SN 2 activates the SCG in response to a request from the UE 3, the SN 2 allows the UE 3 to activate the SCG (or perform an uplink transmission in a DRB using SCG resources) after receiving the confirmation (or acceptance) from the MN 1. This can allow the MN 1 to reject a UE-initiated (or triggered, requested) SCG activation, for example.

The inter-node message (602) may be sent to inform the MN 1 of the SCG activation initiated (or triggered, requested) by the UE 3. In other words, the inter-node message (602) may contain information that explicitly or implicitly indicates UE-initiated (or triggered, requested) SCG activation. The inter-node message (602) may be identical to the message sent from the SN 2 to the MN 1 when the SCG activation is initiated (or triggered) by the SN 2, but may contain information that explicitly or implicitly indicates a UE-initiated (or triggered, requested) SCG activation. By receiving the inter-node message (602) indicating such information, the MN 1 can know that the SCG activation has been triggered by the UE 3. In other words, the MN 1 can identify whether the SCG activation was triggered by the SN 2 or the UE 3.

The second signal (604) may explicitly or implicitly indicate SCG activation to the UE 3. The SN 2 may send the second signal to the UE 3 via a random access procedure or via a downlink physical layer message. The second signal may be or be included in a signal or data (e.g., random access response) sent from the SN 2 to the UE 3 in the random access procedure. Alternatively, the second signal may be or be included in an uplink grant, Downlink Control Information (DCI) indicating the uplink grant, or a physical channel (e.g., Physical Downlink Control Channel (PDCCH)) carrying the DCI. Additionally or alternatively, the second signal may be or be included in a downlink signal (e.g., MAC CE, PDCCH) transmitted after the random access procedure. The second signal indicating SCG activation may indicate acceptance of the SCG activation request.

Figure 7:
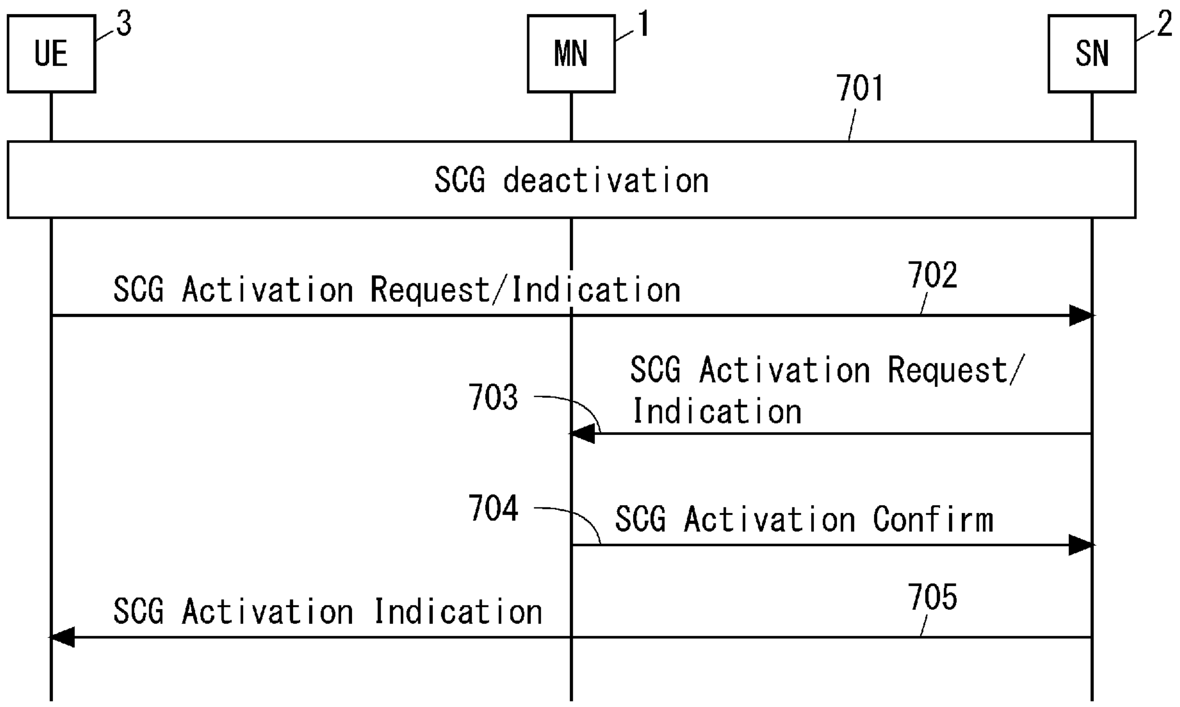
FIG. 7 is a sequence diagram showing an example of a process performed by a master node, a secondary node, and a UE according to an example embodiment.

FIG. 7 shows an example of the operation of the MN 1, SN 2, and UE 3. Steps 701 and 702 are similar to steps 401 and 402 in FIG. 4. Specifically, in step 701, the SCG provided by the SN 2 to the UE 3 is deactivated. The SCG deactivation in step 701 can be initiated, triggered, or requested by the MN 1, the SN 2, or the UE 3. In step 702, the UE 3 sends an SCG activation request (or indication) to the SN 2 in the PSCell. Step 702 corresponds to step 601 in FIG. 6.

In step 703, the SN 2 sends an inter-node message containing an SCG activation request (or indication) to the MN 1. The inter-node message may be an SGNB MODIFICATION REQUIRED message, an S-NODE MODIFICATION REQUIRED message, or an RRC TRANSFER message containing an inter-node RRC message. Step 703 corresponds to step 602 in FIG. 6. In step 704, MN 1 sends to the SN 2 an inter-node message indicating confirmation (or acceptance) of the SCG activation. The inter-node message may be an SGNB MODIFICATION CONFIRM message, an S-NODE MODIFICATION CONFIRM message, or an RRC TRANSFER message containing an inter-node RRC message. Step 704 corresponds to step 603 in FIG. 6. In step 705, the SN 2 sends an SCG activation indication (or notification) to the UE 3 via the PSCell. Step 705 corresponds to step 604 in FIG. 6.

Fourth Example Embodiment

The example configuration of a radio communication network according to this example embodiment is the same as the examples shown in FIG. 1 and FIG. 2. The following describes the operation of the MN 1, the SN 2, and the UE 3 in relation to the activation of the SCG associated with the SN 2.

Figure 8:
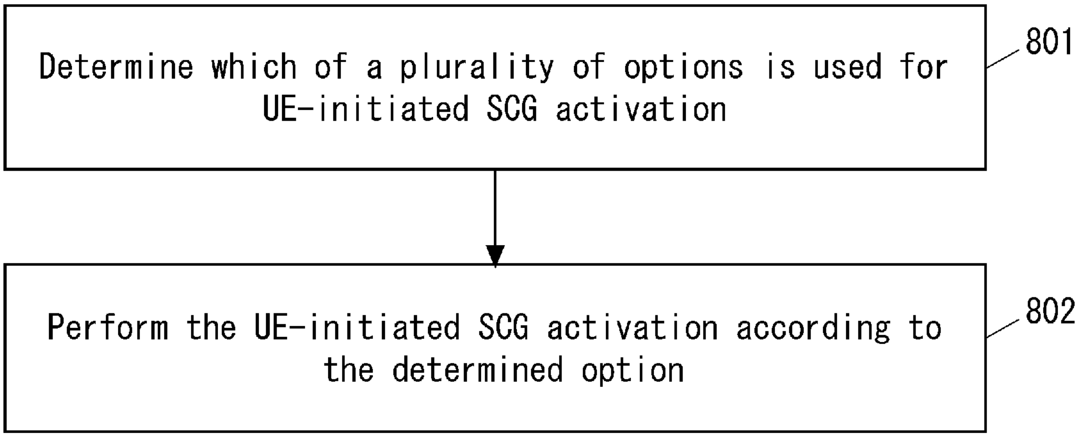
FIG. 8 is a flowchart showing an example of a process performed by a master node and a secondary node according to an example embodiment.

FIG. 8 shows an example of the operation of the SN 2. In step 801, the SN 2 determines which of a plurality of options is used for a UE-initiated (or triggered, requested) SCG activation. In step 802, the SN 2 performs the UE-initiated SCG activation according to the option determined. These multiple options include a first option and a second option. The first option is an option in which the SN 2 transmits a second signal indicating SCG activation to the UE 3 via the PSCell after receiving a first signal indicating an SCG activation request (or indication) from the UE 3 and before sending an inter-node message indicating activation of the SCG to the MN 1. Thus, in an example, the first option corresponds to the SCG activation procedure described in the first example embodiment with reference to FIGS. 3 and 4. On the other hand, the second option is an option in which the SN 2 transmits the second signal to the UE 3 via the PSCell after receiving a response to the inter-node message from the MN 1. Thus, in an example, the second option corresponds to the SCG activation procedure described in the third example embodiment with reference to FIGS. 6 and 7.

An inter-node message sent from the SN 2 to the MN 1 upon the SCG activation may contain information indicating which of the first and second options is being used. This allows the MN 1 to know whether or not the SCG has already been activated based on the request from the UE 3. Specifically, if the inter-node message contains information indicating the first option, the MN 1 can recognize that the SCG has already been activated based on the request from the UE 3. Otherwise, the MN 1 can recognize that the SCG activation has not yet been granted to the UE 3.

Instead of or in addition to the SN 2, the MN 1 may perform the operation shown in FIG. 8. Specifically, the MN 1 may determine which of a plurality of options is used for a UE-initiated (or triggered, requested) SCG activation (step 801). The MN 1 may then perform the UE-initiated SCG activation according to the options determined (step 802). In this case, the plurality of options includes a first option and a second option. The first option is an option in which the MN 1 transmits a second signal indicating SCG activation to the UE 3 via the MCG after receiving a first signal indicating an SCG activation request (or indication) from the UE 3 and before sending an inter-node message indicating activation of the SCG to the SN 2. Thus, in an example, the first option corresponds to the SCG activation procedure described in the second example embodiment with reference to FIG. 5. On the other hand, the second option is an option in which the MN 1 transmits the second signal to the UE 3 via the MCG after receiving a response to the inter-node message from the SN 2.

An inter-node message sent from the MN 1 to the SN 2 upon the SCG activation may contain information indicating which of the first and second options is being used. This allows the SN 2 to know whether or not the SCG has already been activated based on the request from the UE 3. Specifically, if the inter-node message contains information indicating the first option, the SN 2 can recognize that the SCG has already been activated based on the request from the UE 3. Otherwise, the SN 2 can recognize that the SCG activation has not yet been granted to the UE 3.

In some implementations, the SN 2 or the MN 1 may determine which of the first and second options to use based on a priority level or urgency level of the uplink transmission by the UE 3. The priority level or urgency level of the uplink transmission by the UE 3 may be determined by the SN 2 or the MN 1 before or during the deactivation of the UE 3. Alternatively, the priority level or urgency level of the uplink transmission by the UE 3 may be determined by the UE 3. In this case, the first signal sent by the UE 3 to the SN 2 or the MN 1 may indicate the priority or urgency level. If the priority level or urgency level of the uplink transmission by the UE 3 exceeds a threshold value, the SN 2 or the MN 1 may decide to use the first option to activate the SCG based on the request of the UE 3.

Fifth Example Embodiment

The example configuration of a radio communication network according to this example embodiment is the same as the examples shown in FIG. 1 and FIG. 2. The following describes the operation of the MN 1, the SN 2, and the UE 3 in relation to the activation of the SCG associated with the SN 2.

Figure 9:
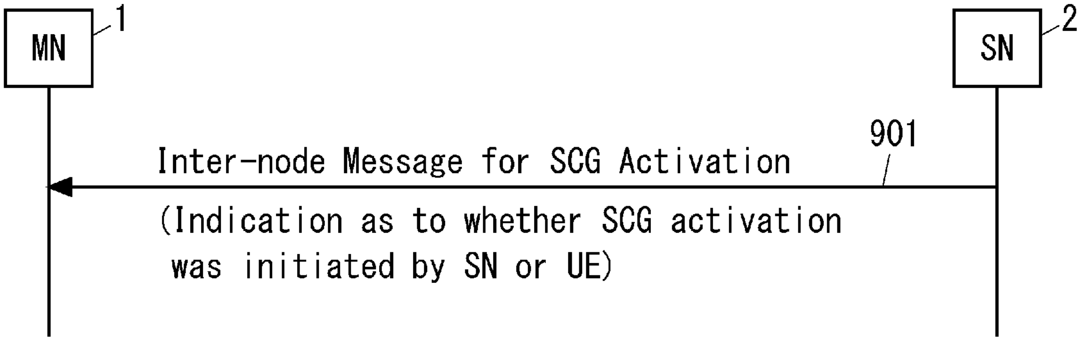
FIG. 9 is a sequence diagram showing an example of a process performed by a master node and a secondary node according to an example embodiment.

FIG. 9 shows an example of the operation of the MN 1 and the SN 2. In step 901, the SN 2 sends an inter-node message to the MN 1 for SCG activation. The inter-node message contains an indication whether the SCG activation was initiated by the SN 2 or the UE 3. The inter-node messages may be an X2 message, an Xn message, or an inter-node RRC message. More specifically, the inter-node message may be an SGNB MODIFICATION REQUIRED message, an S-NODE MODIFICATION REQUIRED message, or an RRC TRANSFER message containing an inter-node RRC message.

Specifically, in response to receiving a signal (e.g., random access preamble, or SR) in the PSCell from the UE 3 representing an SCG activation request or indication while the SCG is deactivated, the SN 2 sends an inter-node message to the MN 1 indicating an SCG activation request or indication (step 903). In this case, the inter-node message is the same as the message sent from the SN 2 to the MN 1 upon an SN-initiated (or triggered, requested) SCG activation, but it contains information that explicitly or implicitly indicates a UE-initiated (or triggered, requested) SCG activation.

The SN 2 sends an inter-node message to the MN 1 indicating an SCG activation request or indication (step 903), also when the SCG is activated based on a request from the SN 2. However, in this case, the inter-node message explicitly or implicitly indicates an SN-initiated (or triggered, requested) SCG activation to the MN 1. In an example, the inter-node message may indicate an SN-initiated SCG activation to the MN 1 by not including an indication of a UE-initiated SCG activation.

Figure 10:
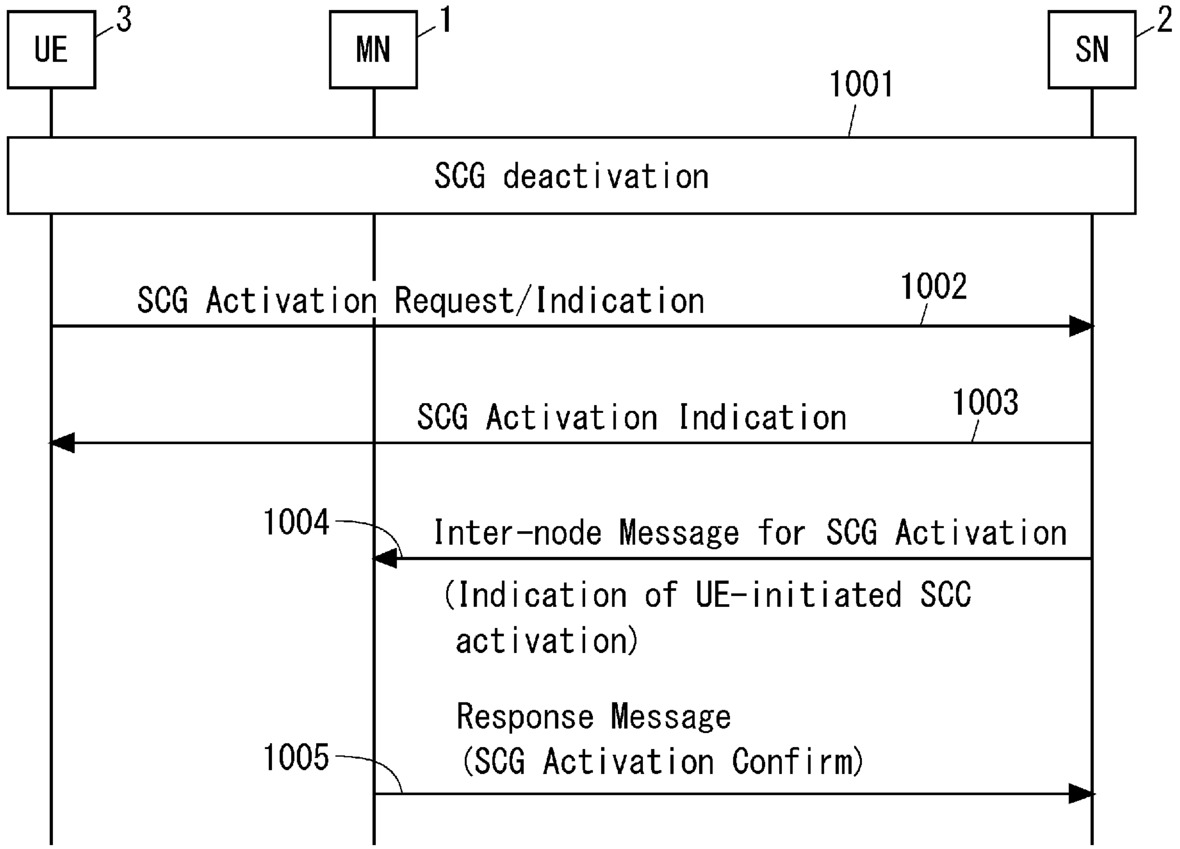
FIG. 10 is a sequence diagram showing an example of a process performed by a master node, a secondary node, and a UE according to an example embodiment.

FIG. 10 shows an example of the operation of the MN 1, SN 2, and UE 3 in relation to a UE-initiated (or triggered, requested) SCG activation. Steps 1001 to 1005 are similar to steps 401 to 405 in FIG. 4. However, the inter-node message in step 1004 is the same as the message sent by the SN 2 to the MN 1 during an SN-initiated SCG activation, but explicitly or implicitly indicates a UE-initiated SCG activation. The inter-node message of step 1004 may be an SGNB MODIFICATION REQUIRED message, an S-NODE MODIFICATION REQUIRED message, or an RRC TRANSFER message containing an inter-node RRC message. The inter-node message of step 1005 may be an SGNB MODIFICATION CONFIRM message, an S-NODE MODIFICATION CONFIRM message, or an RRC TRANSFER message containing an inter-node RRC message.

Figure 11:
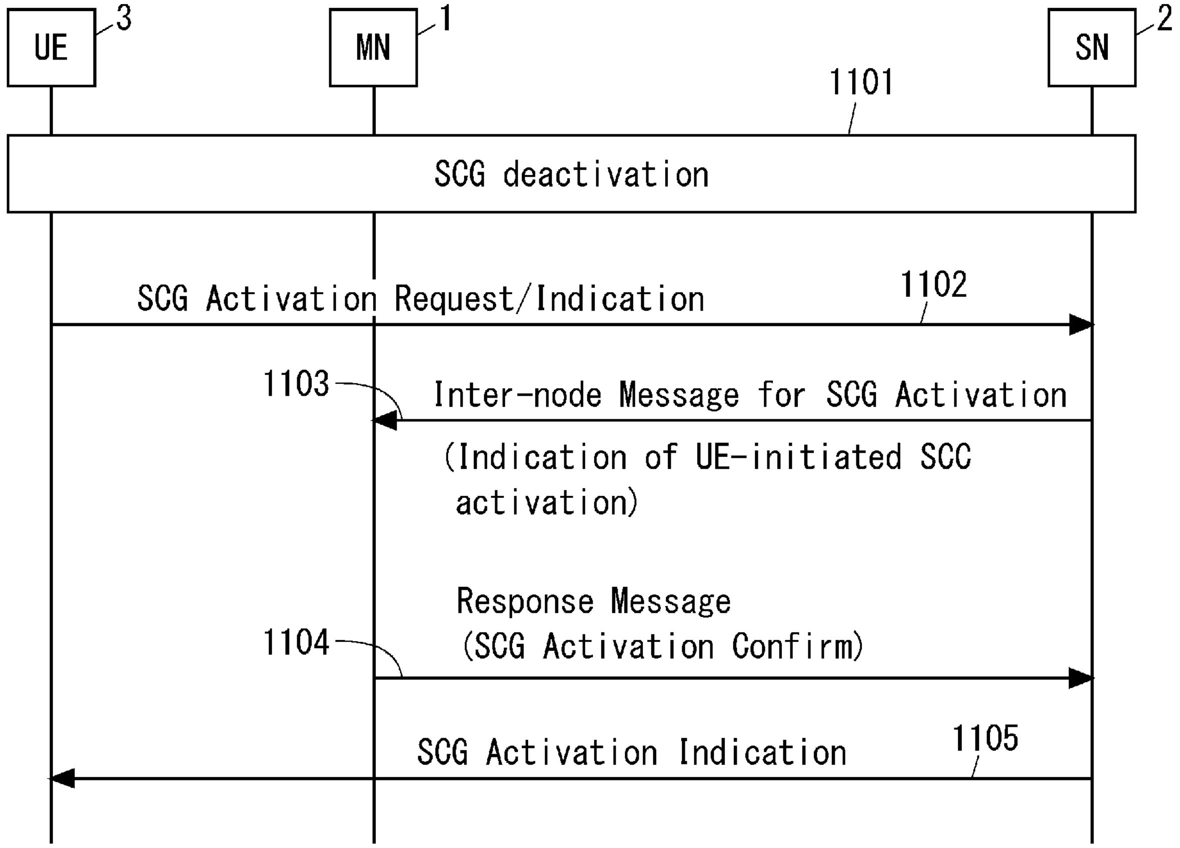
FIG. 11 is a sequence diagram showing an example of a process performed by a master node, a secondary node, and a UE according to an example embodiment.

FIG. 11 shows another example of the operation of the MN 1, SN 2, and UE 3 in relation to a UE-initiated (or triggered, requested) SCG activation. Steps 1101 to 1105 are similar to steps 701 to 705 in FIG. 7. However, the inter-node message in step 1103 is the same as the message sent by the SN 2 to the MN 1 during an SN-initiated SCG activation, but explicitly or implicitly indicates a UE-initiated SCG activation. The inter-node message of step 1103 may be an SGNB MODIFICATION REQUIRED message, an S-NODE MODIFICATION REQUIRED message, or an RRC TRANSFER message containing an inter-node RRC message. The inter-node message of step 1104 may be an SGNB MODIFICATION CONFIRM message, an S-NODE MODIFICATION CONFIRM message, or an RRC TRANSFER message containing an inter-node RRC message.

The operation of the MN 1 and the SN 2 described in this example embodiment can allow the MN 1 to know whether the SCG activation was initiated by the SN 2 or the UE 3.

Sixth Example Embodiment

The example configuration of a radio communication network according to this example embodiment is the same as the examples shown in FIG. 1 and FIG. 2. The following describes the operation of the MN 1, the SN 2, and the UE 3 in relation to the activation of the SCG associated with the SN 2.

Figure 12:
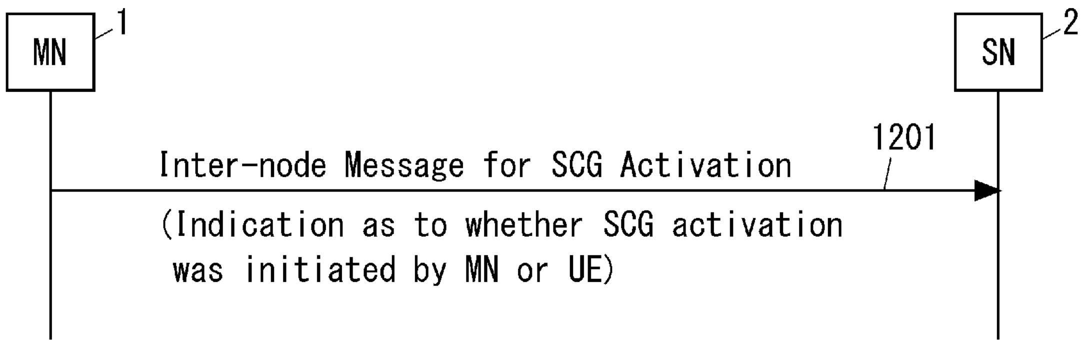
FIG. 12 is a sequence diagram showing an example of a process performed by a master node and a secondary node according to an example embodiment.

FIG. 12 shows an example of the operation of the MN 1 and the SN 2. In step 1201, the MN 1 sends an inter-node message to the SN 2 for SCG activation. The inter-node message contains an indication whether the SCG activation was initiated by the MN 1 or the UE 3. The inter-node messages may be an X2 message, an Xn message, or an inter-node RRC message. More specifically, the inter-node message may be an SGNB MODIFICATION REQUEST message, an S-NODE MODIFICATION REQUEST message, or an RRC TRANSFER message containing an inter-node RRC message.

Specifically, in response to receiving a signal (e.g., MN RRC message or MAC CE (e.g., BSR)) from the UE 3 via the MCG representing an SCG activation request or indication while the SCG is deactivated, the MN 1 sends an inter-node message to the SN 2 indicating an SCG activation request or indication (step 903). In this case, the inter-node message is the same as the message sent from the MN 1 to the SN 2 upon an MN-initiated (or triggered, requested) SCG activation, but it contains information that explicitly or implicitly indicates a UE-initiated (or triggered, requested) SCG activation.

The MN 1 sends an inter-node message to the SN 2 indicating an SCG activation request or indication (step 903), also when the SCG is activated based on a request from the MN 1. However, in this case, the inter-node message explicitly or implicitly indicates an MN-initiated (or triggered, requested) SCG activation to the SN 2. In an example, the inter-node message may indicate an MN-initiated SCG activation to the SN 2 by not including an indication of a UE-initiated SCG activation.

Figure 13:
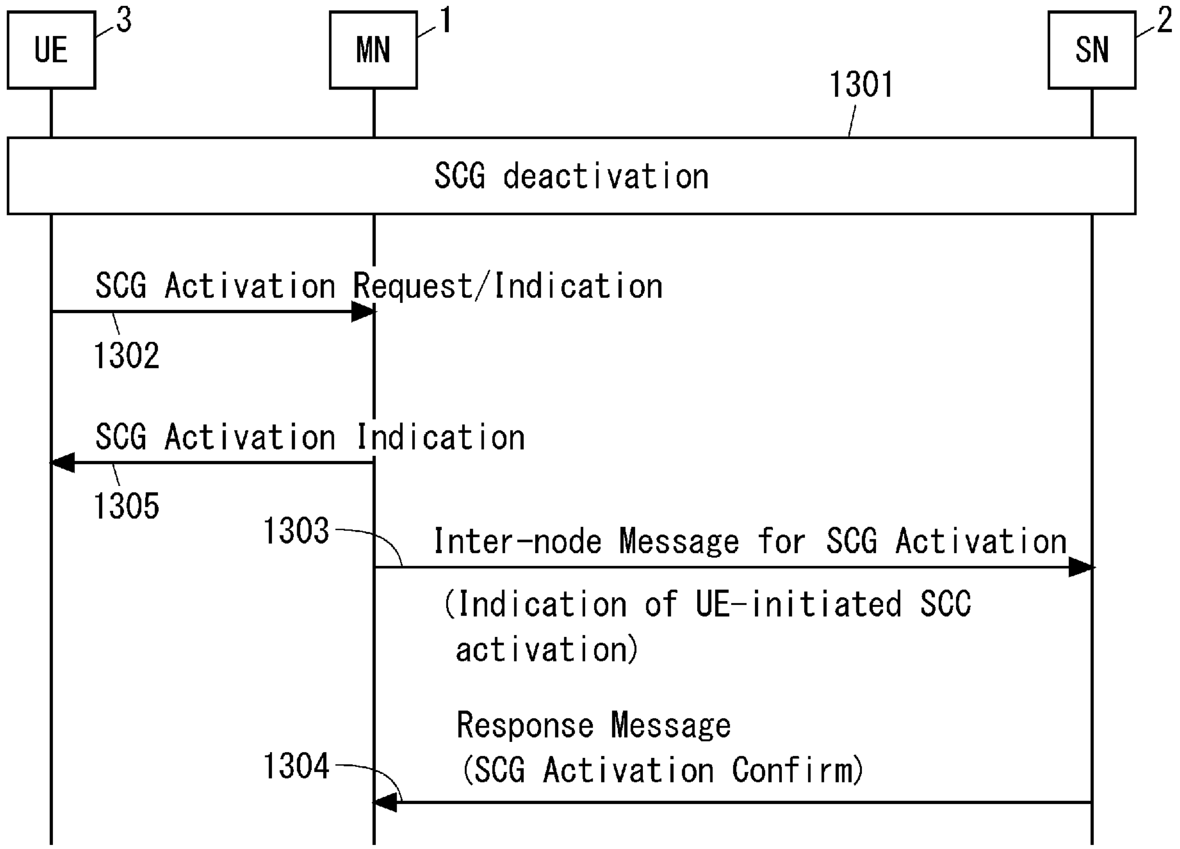
FIG. 13 is a sequence diagram showing an example of a process performed by a master node, a secondary node, and a UE according to an example embodiment.

FIG. 13 shows an example of the operation of the MN 1, SN 2, and UE 3 in relation to a UE-initiated (or triggered, requested) SCG activation. Steps 1301 to 1305 are similar to steps 501 to 505 in FIG. 5. However, the inter-node message in step 1304 is the same as the message sent by the MN 1 to the SN 2 during an MN-initiated SCG activation, but explicitly or implicitly indicates a UE-initiated SCG activation. The inter-node message of step 1303 may be an SGNB MODIFICATION REQUEST message, an S-NODE MODIFICATION REQUEST message, or an RRC TRANSFER message containing an inter-node RRC message. The inter-node message of step 1304 may be an SGNB MODIFICATION REQUEST ACKNOWLEDGE message, an S-NODE MODIFICATION REQUEST ACKNOWLEDGE message, or an RRC TRANSFER message containing an inter-node RRC message.

Figure 14:
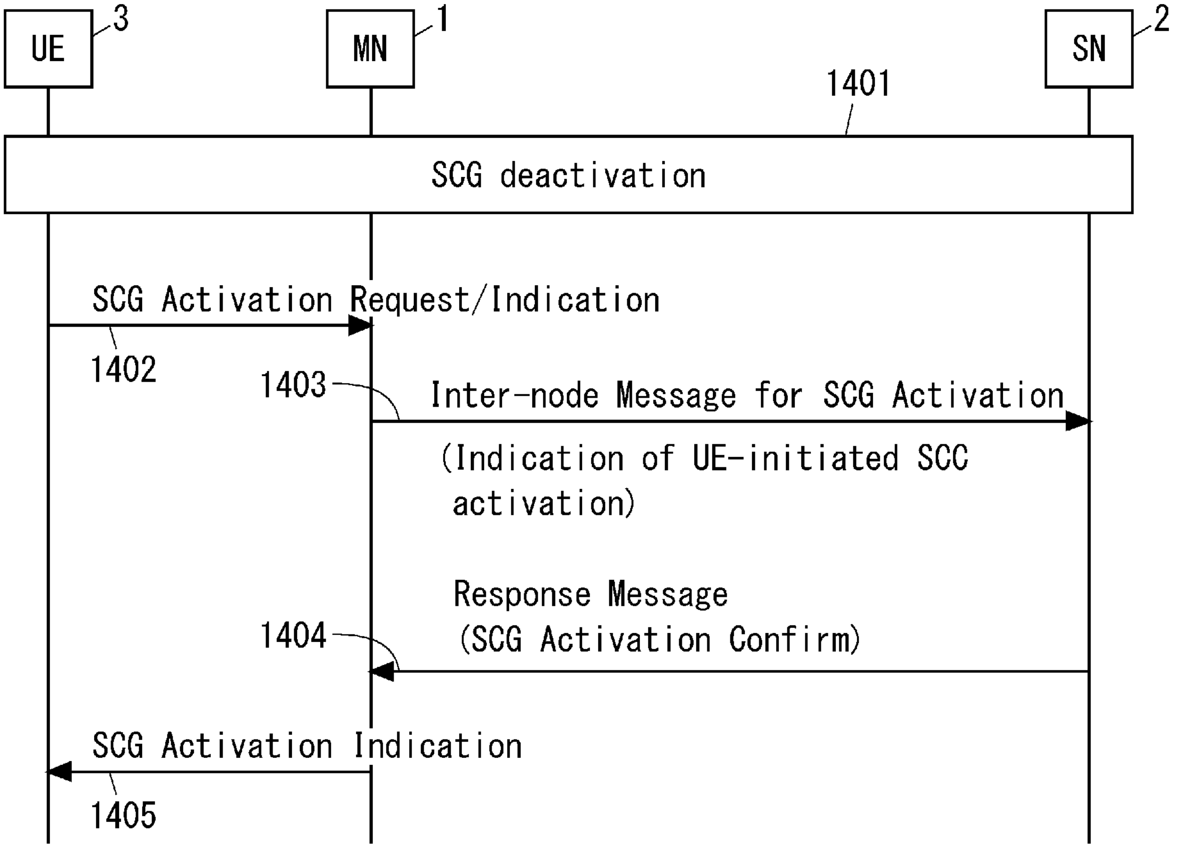
FIG. 14 is a sequence diagram showing an example of a process performed by a master node, a secondary node, and a UE according to an example embodiment.

FIG. 14 shows another example of the operation of the MN 1, SN 2, and UE 3 in relation to a UE-initiated (or triggered, requested) SCG activation. Steps 1401 and 1402 are similar to steps 1301 and 1302 in FIG. 13 and steps 501 and 502 in FIG. 5. In step 1403, the MN 1 sends an inter-node message to the SN 2 containing an SCG activation indication (or notification). The inter-node message is the same as the message sent by the MN 1 to the SN 2 during an MN-initiated SCG activation, but explicitly or implicitly indicates a UE-initiated SCG activation. The inter-node message may be an SGNB MODIFICATION REQUEST message, an S-NODE MODIFICATION REQUEST message, or an RRC TRANSFER message containing an inter-node RRC message. In step 1404, the SN 2 sends an inter-node message to the MN 1 indicating confirmation (or acceptance) of the SCG activation. The inter-node message may be an SGNB MODIFICATION REQUEST ACKNOWLEDGE message, an S-NODE MODIFICATION REQUEST ACKNOWLEDGE message, or an RRC TRANSFER message containing an inter-node RRC message. In step 1405, the MN 1 transmits an SCG activation indication (or notification) to the UE 3 via the MCG. The SCG activation indication (or notification) in step 1405 may be sent to the UE 3 via an MN RRC message, MAC CE, or DCI.

The operation of the MN 1 and the SN 2 described in this example embodiment can allow the SN 2 to know whether the SCG activation was initiated by the MN 1 or the UE 3.

Seventh Example Embodiment

The example configuration of a radio communication network according to this example embodiment is the same as the examples shown in FIG. 1 and FIG. 2. The following describes the operation of the MN 1, the SN 2, and the UE 3 in relation to the activation of the SCG associated with the SN 2.

Figure 15:
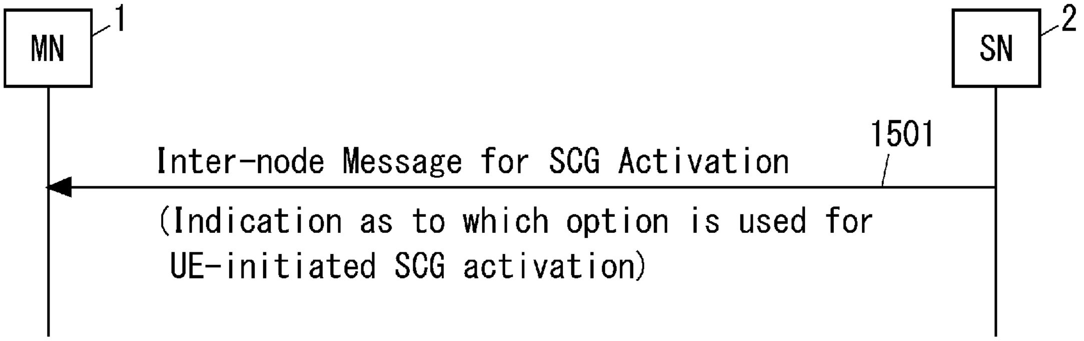
FIG. 15 is a sequence diagram showing an example of a process performed by a master node and a secondary node according to an example embodiment.

FIG. 15 shows an example of the operation of the MN 1 and the SN 2. In step 1501, the SN 2 sends an inter-node message to the MN 1 for SCG activation. The inter-node message may be an SGNB MODIFICATION REQUIRED message, an S-NODE MODIFICATION REQUIRED message, or an RRC TRANSFER message containing an inter-node RRC message. The inter-node message contains an indication of which option is being used for a UE-initiated (or triggered, requested) SCG activation. These multiple options include a first option and a second option. Thus, the inter-node message may contain information indicating whether the first option or the second option is being used to activate the SCG.

The first option is an option in which the SN 2 transmits a second signal indicating SCG activation to the UE 3 via the PSCell after receiving a first signal indicating an SCG activation request (or indication) from the UE 3 and before sending an inter-node message indicating activation of the SCG to the MN 1. Thus, in an example, the first option corresponds to the SCG activation procedure described in the first example embodiment with reference to FIGS. 3 and 4. On the other hand, the second option is an option in which the SN 2 transmits the second signal to the UE 3 via the PSCell after receiving a response to the inter-node message from the MN 1. Thus, in an example, the second option corresponds to the SCG activation procedure described in the third example embodiment with reference to FIGS. 6 and 7.

Figure 16:
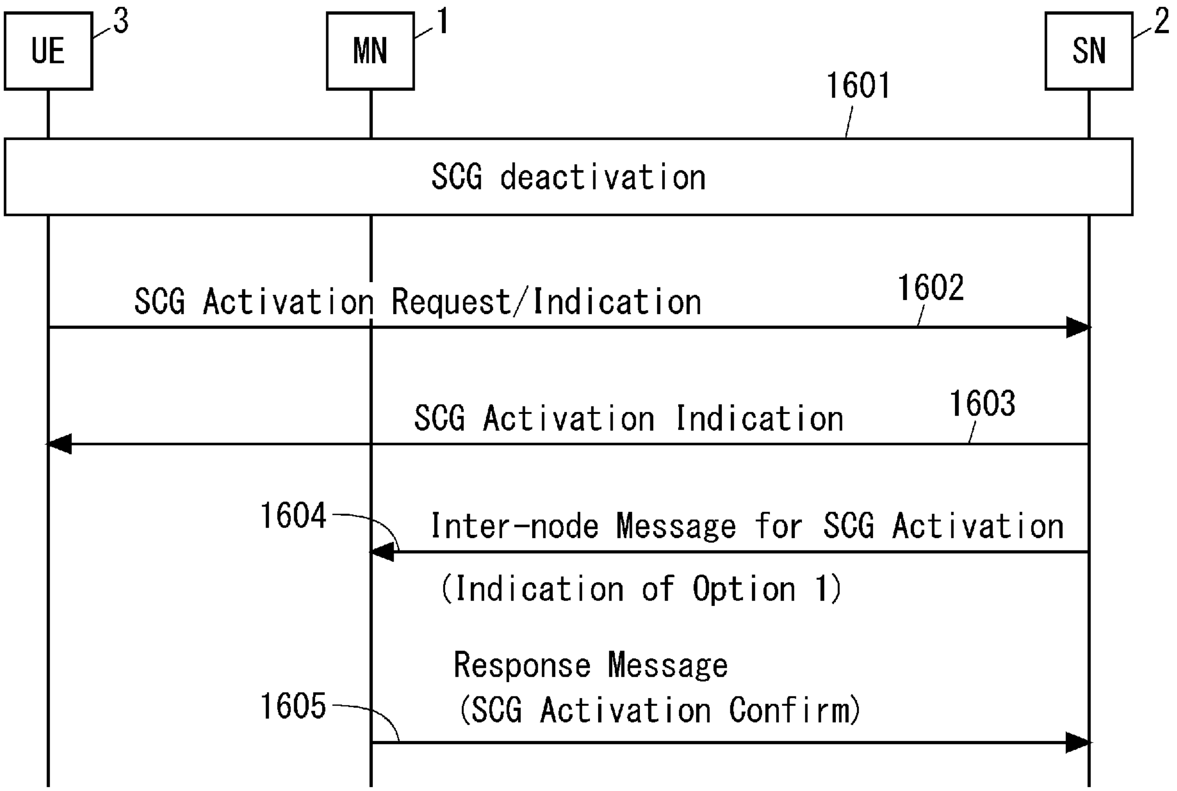
FIG. 16 is a sequence diagram showing an example of a process performed by a master node, a secondary node, and a UE according to an example embodiment.

FIG. 16 shows an example of the operation of the MN 1, SN 2, and UE 3 in relation to a UE-initiated (or triggered, requested) SCG activation. Steps 1601 to 1605 are similar to steps 401 to 405 in FIG. 4 or steps 1001 to 1005 in FIG. 10. However, the inter-node message in step 1604 explicitly or implicitly indicates that the first option is being used for the UE-initiated SCG activation. The inter-node message of step 1604 may be an SGNB MODIFICATION REQUIRED message, an S-NODE MODIFICATION REQUIRED message, or an RRC TRANSFER message containing an inter-node RRC message. The inter-node message of step 1605 may be an SGNB MODIFICATION CONFIRM message, an S-NODE MODIFICATION CONFIRM message, or an RRC TRANSFER message containing an inter-node RRC message.

Figure 17:
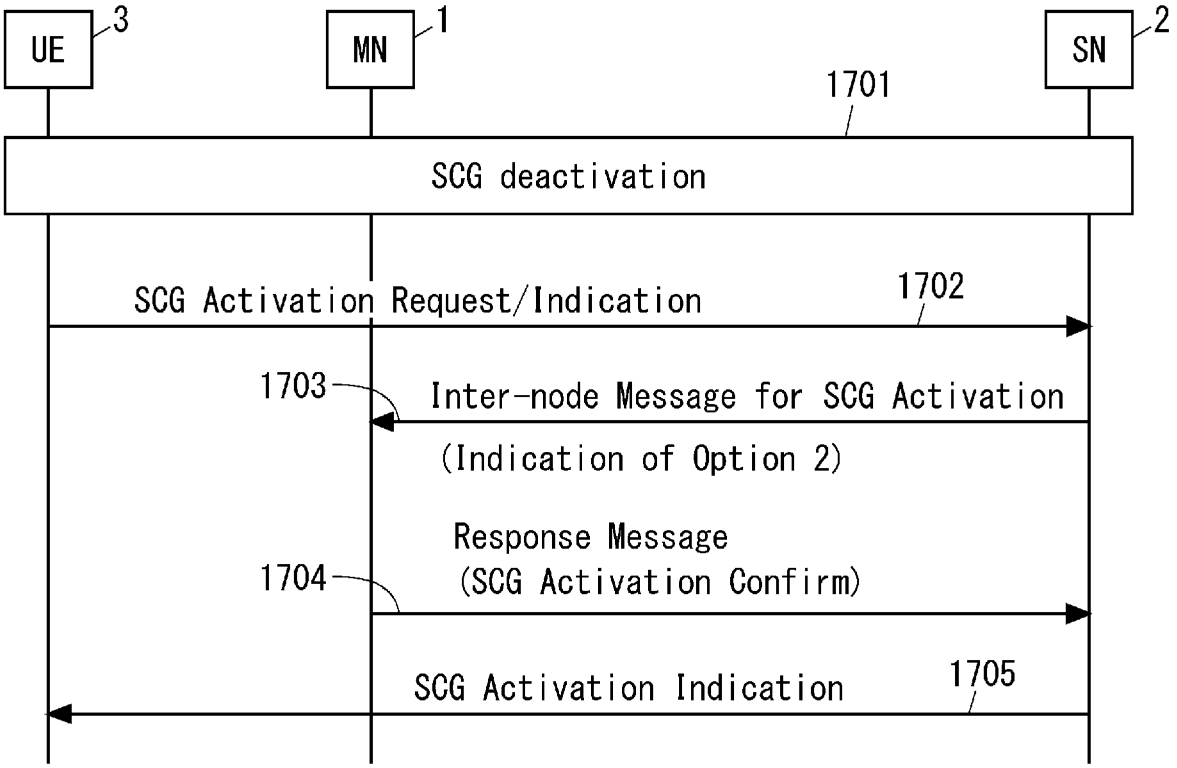
FIG. 17 is a sequence diagram showing an example of a process performed by a master node, a secondary node, and a UE according to an example embodiment.

FIG. 17 shows another example of the operation of the MN 1, SN 2, and UE 3 in relation to a UE-initiated (or triggered, requested) SCG activation. Steps 1701 to 1705 are similar to steps 701 to 705 in FIG. 7 or steps 1101 to 1105 in FIG. 11. However, the inter-node message in step 1703 explicitly or implicitly indicates that the second option is being used for the UE-initiated SCG activation. The inter-node message of step 1703 may be an SGNB MODIFICATION REQUIRED message, an S-NODE MODIFICATION REQUIRED message, or an RRC TRANSFER message containing an inter-node RRC message. The inter-node message of step 1704 may be an SGNB MODIFICATION CONFIRM message, an S-NODE MODIFICATION CONFIRM message, or an RRC TRANSFER message containing an inter-node RRC message.

The operation of the MN1 and the SN2 described in this example embodiment can allow the MN1 to know which option is being used for a UE-initiated (or triggered, requested) SCG activation.

Eighth Example Embodiment

The example configuration of a radio communication network according to this example embodiment is the same as the examples shown in FIG. 1 and FIG. 2. The following describes the operation of the MN 1, the SN 2, and the UE 3 in relation to the activation of the SCG associated with the SN 2.

Figure 18:
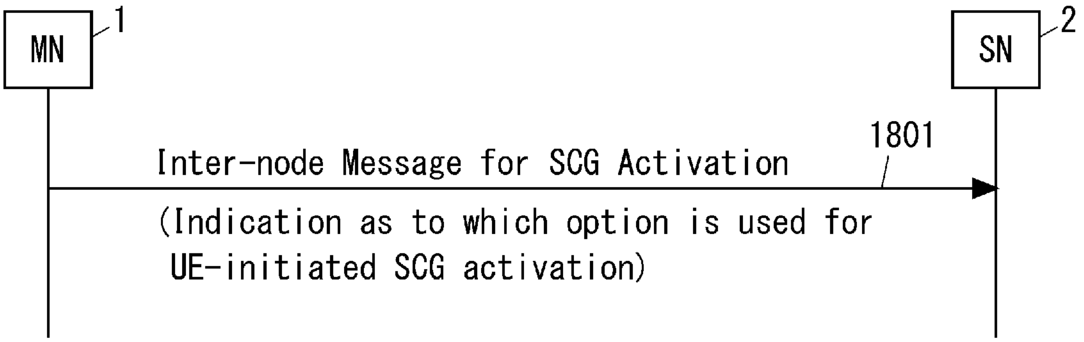
FIG. 18 is a sequence diagram showing an example of a process performed by a master node and a secondary node according to an example embodiment.

FIG. 18 shows an example of the operation of the MN 1 and the SN 2. In step 1801, the MN 1 sends an inter-node message to the SN 2 for SCG activation. The inter-node message may be an SGNB MODIFICATION REQUEST message, an S-NODE MODIFICATION REQUEST message, or an RRC TRANSFER message containing an inter-node RRC message. The inter-node message contains an indication of which option is being used for a UE-initiated (or triggered, requested) SCG activation. These multiple options include a first option and a second option. Thus, the inter-node message may contain information indicating whether the first option or the second option is being used to activate the SCG.

The first option is an option in which the MN 1 transmits a second signal indicating SCG activation to the UE 3 via the MCG after receiving a first signal indicating an SCG activation request (or indication) from the UE 3 and before sending an inter-node message indicating activation of the SCG to the SN 2. Thus, in an example, the first option corresponds to the SCG activation procedure described in the second example embodiment with reference to FIG. 5. On the other hand, the second option is an option in which the MN 1 transmits the second signal to the UE 3 via the MCG after receiving a response to the inter-node message from the SN 2.

Figure 19:
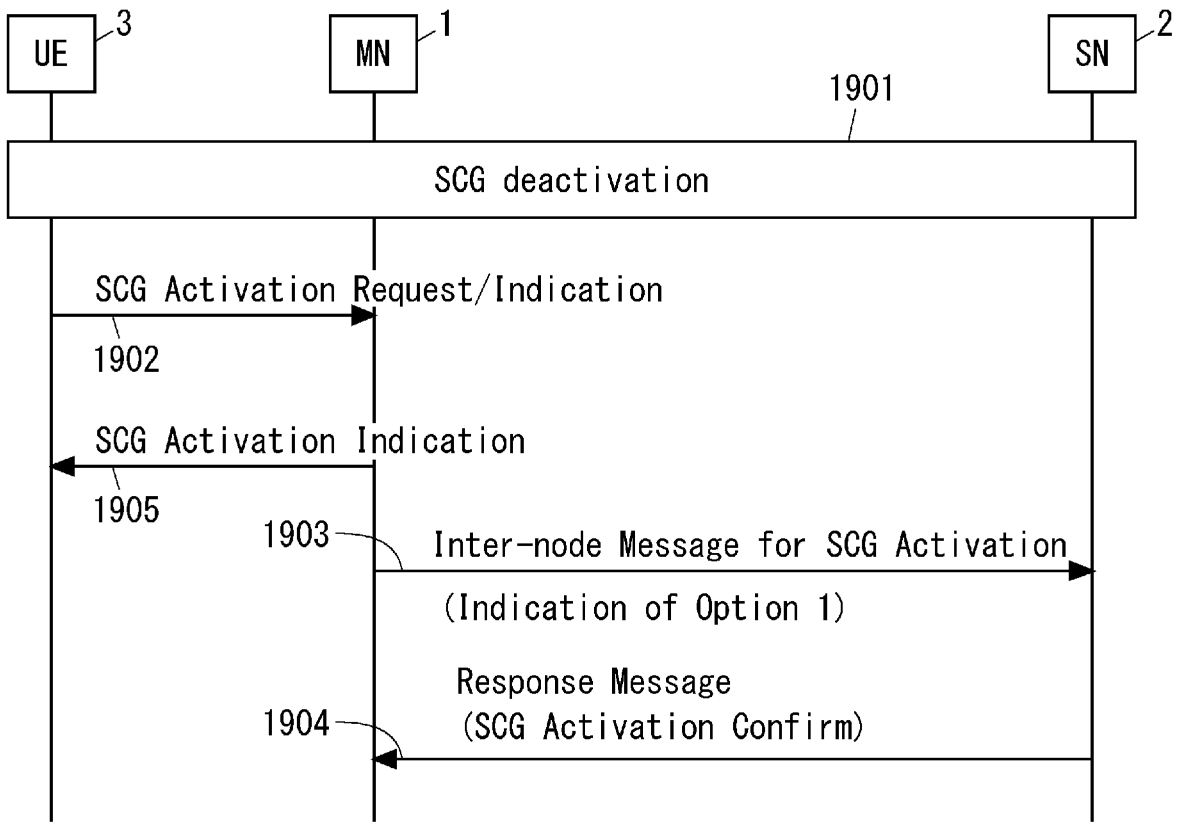
FIG. 19 is a sequence diagram showing an example of a process performed by a master node, a secondary node, and a UE according to an example embodiment.

FIG. 19 shows an example of the operation of the MN 1, SN 2, and UE 3 in relation to a UE-initiated (or triggered, requested) SCG activation. Steps 1901 to 1905 are similar to steps 501 to 505 in FIG. 5 or steps 1301 to 1305 in FIG. 13. However, the inter-node message in step 1904 explicitly or implicitly indicates that the first option is being used for the UE-initiated SCG activation. The inter-node message of step 1903 may be an SGNB MODIFICATION REQUEST message, an S-NODE MODIFICATION REQUEST message, or an RRC TRANSFER message containing an inter-node RRC message. The inter-node message of step 1904 may be an SGNB MODIFICATION REQUEST ACKNOWLEDGE message, an S-NODE MODIFICATION REQUEST ACKNOWLEDGE message, or an RRC TRANSFER message containing an inter-node RRC message.

Figure 20:
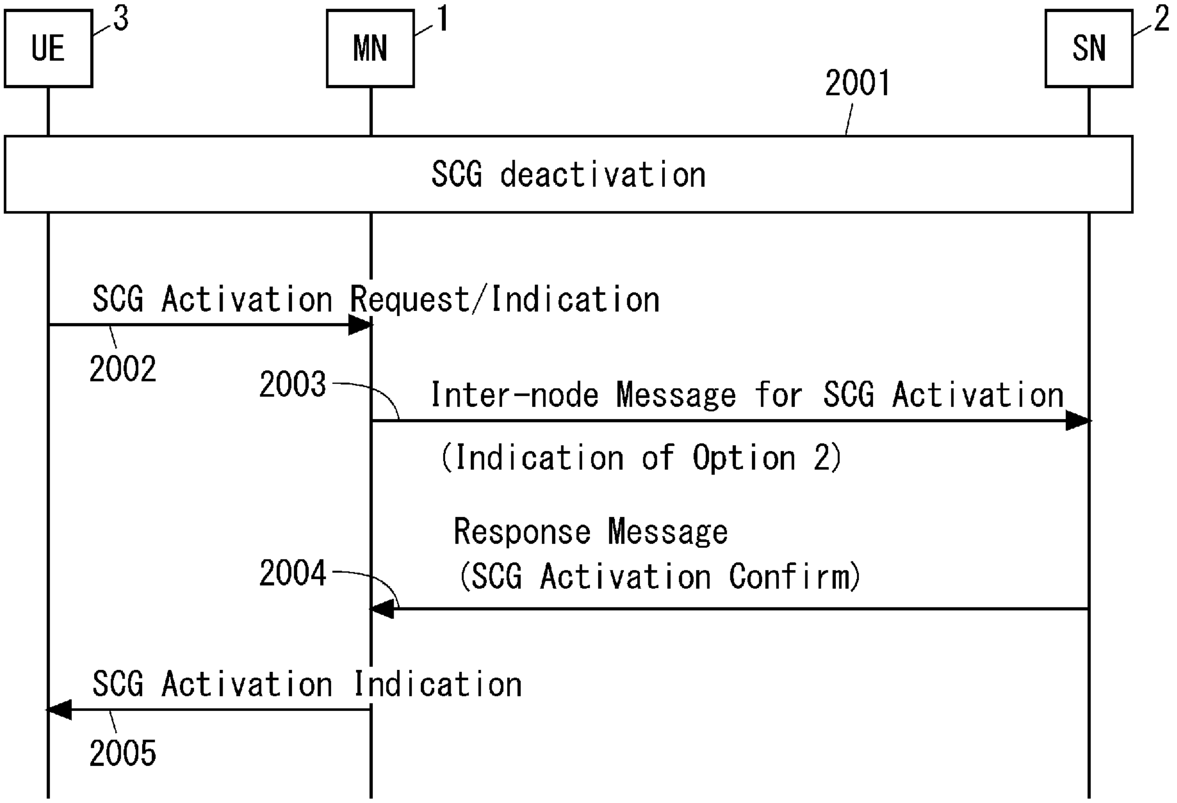
FIG. 20 is a sequence diagram showing an example of a process performed by a master node, a secondary node, and a UE according to an example embodiment.

FIG. 20 shows another example of the operation of the MN 1, SN 2, and UE 3 in relation to a UE-initiated (or triggered, requested) SCG activation. Steps 2001 to 2005 are similar to steps 1401 to 1405 in FIG. 14. However, the inter-node message in step 2003 explicitly or implicitly indicates that the second option is being used for the UE-initiated SCG activation. The inter-node message of step 2003 may be an SGNB MODIFICATION REQUEST message, an S-NODE MODIFICATION REQUEST message, or an RRC TRANSFER message containing an inter-node RRC message. The inter-node message of step 2004 may be an SGNB MODIFICATION REQUEST ACKNOWLEDGE message, an S-NODE MODIFICATION REQUEST ACKNOWLEDGE message, or an RRC TRANSFER message containing an inter-node RRC message.

The operation of the MN 1 and the SN 2 described in this example embodiment can allow the SN 2 to know which option is being used for a UE-initiated (or triggered, requested) SCG activation.

Ninth Example Embodiment

The example configuration of a radio communication network according to this example embodiment is the same as the examples shown in FIG. 1 and FIG. 2. The following describes the operation of the SN 2 and the UE 3 in relation to the activation of the SCG associated with the SN 2.

Figure 21:
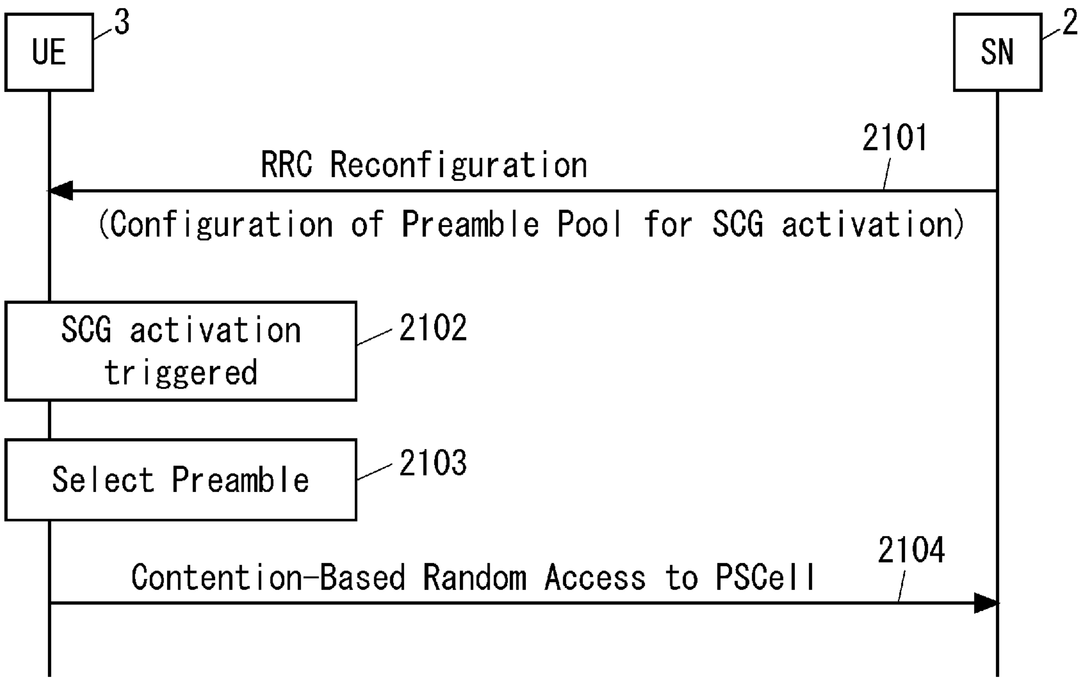
FIG. 21 is a sequence diagram showing an example of a process performed by a secondary node and a UE according to an example embodiment.

FIG. 21 shows an example of the operation of the SN 2 and the UE 3. In step 2101, the SN 2 configures the UE 3 with a random access preamble pool dedicated to SCG activation. The random access preamble pool dedicated to SCG activation (i.e., used when the UE 3 requests the SN 2 for SCG activation) is used by one or more UEs, including the UE 3, to perform contention-based random access to the PSCell in the SCG for SCG activation.

Specifically, in step 2101, the SN 2 may send to the UE 3 an SN RRC Reconfiguration message containing a configuration of the preamble pool dedicated to the SCG activation. For example, before the SCG is deactivated, the SN 2 may send this SN RRC Reconfiguration message to the UE 3. In this case, the SN 2 can send this SN RRC Reconfiguration message to the UE 3 via a Signalling Radio Bearer (SRB) (e.g., SRB3) of the SCG (e.g., PSCell). Alternatively, the SN 2 can send this SN RRC Reconfiguration message to the UE 3 via an SRB (e.g., SRB1) of the MN 1 and the MCG. In another example, the SN 2 may send this SN RRC Reconfiguration message to the UE 3 while the SCG is deactivated. In this case, the SN 2 can send this SN RRC Reconfiguration message to the UE 3 via an SRB (e.g., SRB1) of the MN 1 and the MCG.

In step 2102, a UE-initiated SCG activation is triggered. For example, an SCG activation is triggered by the arrival of uplink data to be transmitted in a DRB that uses SCG resources while the SCG is deactivated. This DRB may be an SCG DRB or a split DRB. The SCG DRB is a DRB that has an RLC bearer only in the SCG associated with the SN 2. On the other hand, the split DRB is a DRB that has both an RLC bearer in the MCG associated with the MN 1 and an RLC bearer in the SCG. The SCG DRB and the split DRB may be SN terminated bearers terminated by the SN 2 or MN terminated bearers terminated by the MN 1. An SN terminated bearer is a radio bearer for which the PDCP is located in the SN 2. An MN terminated bearer is a radio bearer for which the PDCP is located in the MN 1. Alternatively, detection by the UE 3 of a Radio Link Failure (RLF) in the MCG triggers the SCG activation.

In step 2103, the UE 3 selects a preamble from the preamble pool dedicated for SCG activation. In step 2104, the UE 3 initiates a contention-based random access to the PSCell using the selected preamble to activate the SCG. The random access (or random access preamble) in step 2104 requests the SN 2 to activate the SCG. Alternatively, the random access (or random access preamble) in step 2104 indicates to the SN 2 that the SCG needs to be activated.

According to the operation of the SN 2 and the UE 3 described in this example embodiment, the SN 2 and the UE 3 use a contention-based random access (CBRA) to activate the SCG. In other words, in this implementation, the SN 2 and the UE 3 do not require a contention-free random access (CFRA) in order to activate the SCG. Thus, the SN 2 does not need to assign a dedicated random access preamble for CFRA to each of the UEs with a deactivated SCG. This can help to avoid a shortage of preamble resources for CFRA. In addition, the UE 3 performs a CBRA for SCG activation, but uses a preamble pool dedicated to SCG activation. This is expected to reduce the probability of preamble transmission collisions compared to the case where the preamble pool is also used for purposes other than SCG activation. This can help to reduce the delay in SCG activation.

Tenth Example Embodiment

The example configuration of a radio communication network according to this example embodiment is the same as the examples shown in FIG. 1 and FIG. 2. The following describes the operation of the SN 2 and the UE 3 in relation to the activation of the SCG associated with the SN 2.

Figure 22:
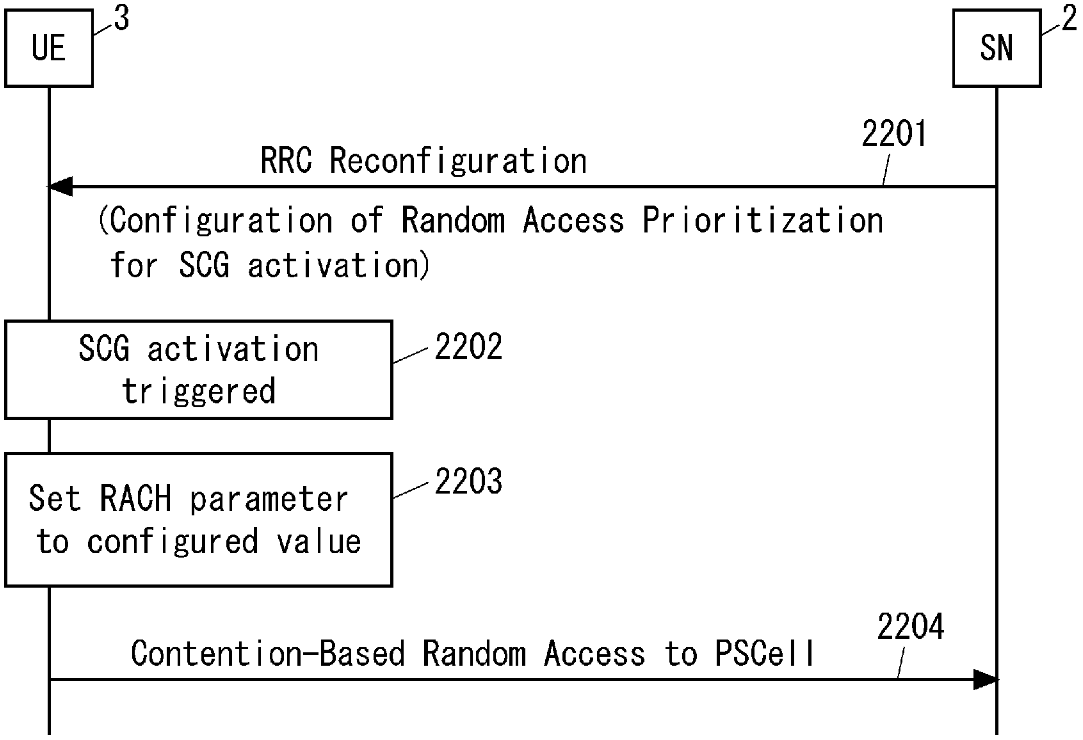
FIG. 22 is a sequence diagram showing an example of a process performed by a secondary node and a UE according to an example embodiment.

FIG. 22 shows an example of the operation of the SN 2 and the UE 3. In step 2201, the SN 2 sends a random access prioritization configuration to the UE 3 if the SCG of the UE 3 is currently deactivated or will be deactivated. Specifically, in step 2201, the SN 2 may send to the UE 3 an SN RRC Reconfiguration message containing the random access prioritization configuration. For example, before the SCG is deactivated, the SN 2 may send this SN RRC Reconfiguration message to the UE 3. In this case, the SN 2 can send this SN RRC Reconfiguration message to the UE 3 via an SRB (e.g., SRB3) of the SCG (e.g., PSCell). Alternatively, the SN 2 can send this SN RRC Reconfiguration message to the UE 3 via an SRB (e.g., SRB1) of the MN 1 and the MCG. In another example, the SN 2 may send this SN RRC Reconfiguration message to the UE 3 while the SCG is deactivated. In this case, the SN 2 can send this SN RRC Reconfiguration message to the UE 3 via an SRB (e.g., SRB1) of the MN 1 and the MCG.

The random access prioritization configuration causes the UE 3 to set a power ramping factor or a scaling factor for a backoff indicator, or both, to a value indicated by the random access prioritization configuration, if a random access procedure is initiated to activate the SCG and the random access prioritization configuration has been configured in the UE 3 by the SN 2. The power ramping factor indicates the step (i.e., power ramping step size) at which the transmit power is ramped up for retransmission after an unsuccessful preamble transmission. The backoff indicator is used by the UE 3 to determine the time delay (i.e., backoff window size) when the UE 3 retries a random access after an unsuccessful preamble transmission. The backoff indicator is signaled by the MAC subheader for the random access response. For normal (or non-prioritized) random accesses, the UE 3 sets the scaling factor for the backoff indicator to 1. In contrast, the random access prioritization configuration can specify that the scaling factor for the backoff indicator is set to a value less than 1 (e.g., 0, 0.25, 0.5, or 0.75).

In step 2202, a UE-initiated SCG activation is triggered. For example, an SCG activation is triggered by the arrival of uplink data to be transmitted in a DRB that uses SCG resources while the SCG is deactivated. This DRB may be an SCG DRB or a split DRB. The SCG DRB is a DRB that has an RLC bearer only in the SCG associated with the SN 2. On the other hand, the split DRB is a DRB that has both an RLC bearer in the MCG associated with the MN 1 and an RLC bearer in the SCG. The SCG DRB and the split DRB may be SN terminated bearers terminated by the SN 2 or MN terminated bearers terminated by the MN 1. An SN terminated bearer is a radio bearer for which the PDCP is located in the SN 2. An MN terminated bearer is a radio bearer for which the PDCP is located in the MN 1. Alternatively, detection by the UE 3 of a Radio Link Failure (RLF) in the MCG triggers the SCG activation.

In step 2203, the UE 3 sets one or more Random Access Channel (RACH) parameters to the respective values specified in the random access priority configuration. The one or more RACH parameters may include a power ramping factor, or a scaling factor for a backoff indicator, or both. The one or more RACH parameters may include other RACH parameters.

In step 2204, UE 3 initiates contention-based random access to the PSCell using the set RACH parameter(s) to activate the SCG. The random access (or random access preamble) in step 2204 requests the SN 2 to activate the SCG. Alternatively, the random access (or random access preamble) in step 2204 indicates to the SN 2 that the SCG needs to be activated.

According to the operation of the SN 2 and the UE 3 described in this example embodiment, the SN 2 and the UE 3 use a CBRA to activate the SCG. In other words, in this implementation, the SN 2 and the UE 3 do not require a CFRA in order to activate the SCG. Thus, the SN 2 does not need to assign a dedicated random access preamble for CFRA to each of the UEs with a deactivated SCG. This can help to avoid a shortage of preamble resources for CFRA. In addition, the UE 3 performs a CBRA for SCG activation, but this CBRA is a prioritized random access. Thus, even if the UE 3 fails to transmit the first preamble, it can increase the probability that the UE 3 will succeed in retransmitting the preamble. This can help to reduce the delay in SCG activation.

Figure 23:
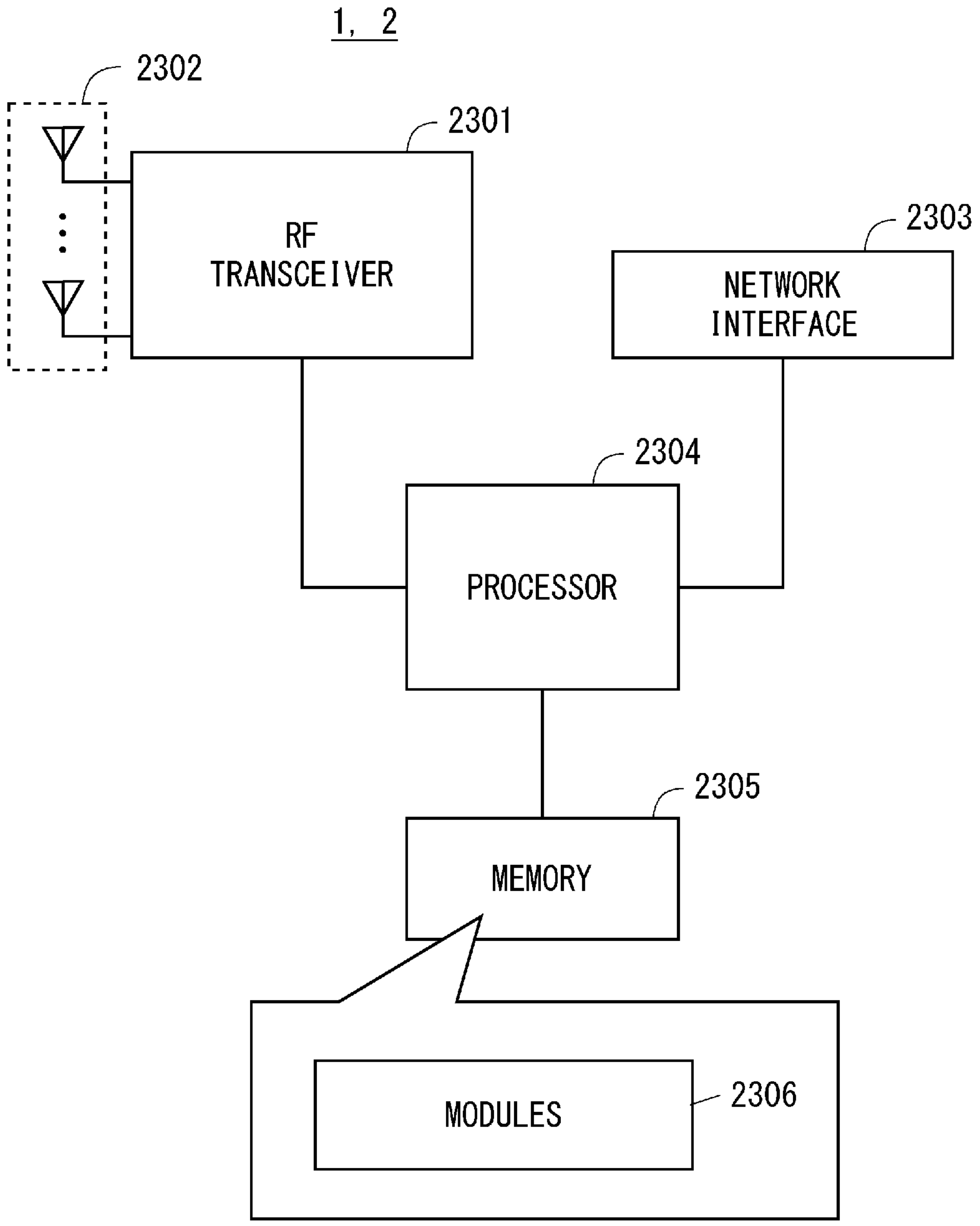
FIG. 23 is a block diagram showing an example configuration of a RAN node according to an example embodiment.

The following provides configuration examples of the MN 1, SN 2, and UE 3 according to the above-described example embodiments. FIG. 23 is a block diagram showing a configuration example of the MN 1 according to the example embodiments described above. The configuration of the SN 2 may be the same as that shown in FIG. 23. Referring to FIG. 15, the MN 1 includes a Radio Frequency transceiver 2301, a network interface 2303, a processor 2304, and a memory 2305. The RF transceiver 2301 performs analog RF signal processing to communicate with UEs including the UE 3. The RF transceiver 2301 may include a plurality of transceivers. The RF transceiver 2301 is coupled to an antenna array 2302 and the processor 2304. The RF transceiver 2301 receives modulation symbol data from the processor 2304, generates a transmission RF signal, and supplies the transmission RF signal to the antenna array 2302. The RF transceiver 2301 generates a baseband reception signal based on a reception RF signal received by the antenna array 2302 and supplies the baseband reception signal to the processor 2304. The RF transceiver 2301 may include an analog beamformer circuit for beamforming. The analog beamformer circuit includes, for example, a plurality of phase shifters and a plurality of power amplifiers.

The network interface 2303 is used to communicate with network nodes (e.g., SN 2, and control and transfer nodes in the core network). The network interface 2303 may include, for example, a Network Interface Card (NIC) that complies with the IEEE 802.3 series.

The processor 2304 performs digital baseband signal processing (data-plane processing) and control-plane processing for radio communication. The processor 2304 may include a plurality of processors. For example, the processor 2304 may include a modem processor (e.g., Digital Signal Processor (DSP)) for performing the digital baseband signal processing and a protocol stack processor (e.g., Central Processing Unit (CPU) or Micro Processing Unit (MPU)) for performing the control-plane processing. The processor 2304 may include a digital beamformer module for beamforming. The digital beamformer module may include a Multiple Input Multiple Output (MIMO) encoder and pre-coder.

The memory 2305 is composed of a combination of a volatile memory and a non-volatile memory. The volatile memory is, for example, a Static Random Access Memory (SRAM), a Dynamic RAM (DRAM), or a combination thereof. The non-volatile memory may be a Mask Read Only Memory (MROM), an Electrically Erasable Programmable ROM (EEPROM), a flash memory, or a hard disk drive, or any combination thereof. The memory 2305 may include a storage located away from the processor 2304. In this case, the processor 2304 may access the memory 2305 via the network interface 2303 or an I/O interface not shown.

The memory 2305 may store one or more software modules (computer programs) 2306 including instructions and data for performing processing by the MN 1 described in the above example embodiments. In some implementations, the processor 2304 may be configured to load and execute the software module(s) 2306 from the memory 2305, thereby performing the processing of the MN 1 described in the above example embodiments.

When the MN 1 is a CU (e.g., eNB-CU or gNB-CU) or a CU-CP, the MN 1 does not need to include the RF transceiver 2301 (and the antenna array 2302).

Figure 24:
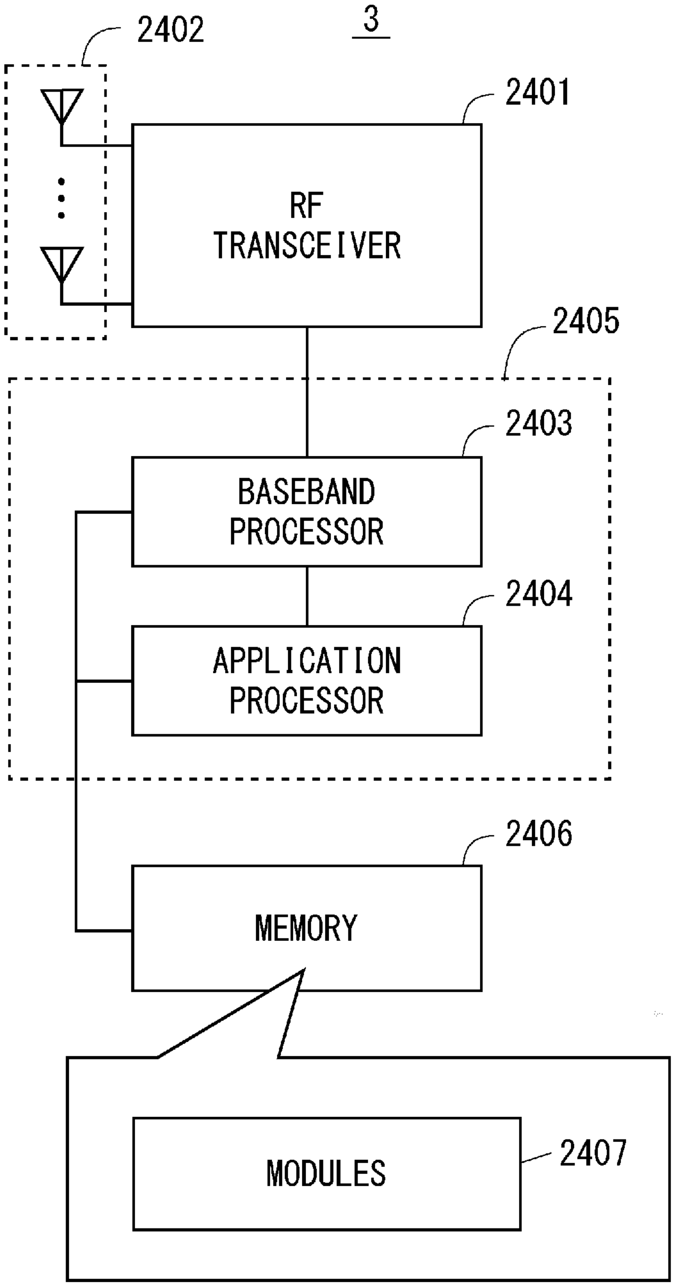
FIG. 24 is a block diagram showing an example configuration of a UE according to an example embodiment.

FIG. 24 is a block diagram showing a configuration example of the UE 3. The radio frequency (RF) transceiver 2401 performs analog RF signal processing to communicate with the MN 1 and the S-SN 2. The RF transceiver 2401 may include a plurality of transceivers. The analog RF signal processing performed by the RF transceiver 2401 includes frequency up-conversion, frequency down-conversion, and amplification. The RF transceiver 2401 is coupled to the antenna array 2402 and the baseband processor 2403. The RF transceiver 2401 receives modulation symbol data (or OFDM symbol data) from the baseband processor 2403, generates a transmission RF signal, and supplies the transmission RF signal to the antenna array 2402. The RF transceiver 2401 generates a baseband reception signal based on the reception RF signal received by the antenna array 2402 and supplies the baseband reception signal to the baseband processor 2403. The RF transceiver 2401 may include an analog beamformer circuit for beamforming. The analog beamformer circuit includes, for example, a plurality of phase shifters and a plurality of power amplifiers.

The baseband processor 2403 performs digital baseband signal processing (data-plane processing) and control-plane processing for wireless communication. The digital baseband signal processing includes (a) data compression/decompression, (b) data segmentation/concatenation, (c) transmission format (transmission frame) composition/decomposition, (d) channel encoding/decoding, (e) modulation (i.e., symbol mapping)/demodulation, and (f) Inverse Fast Fourier Transform (IFFT) generation of OFDM symbol data (baseband OFDM signal). On the other hand, the control-plane processing includes communication management of layer 1 (e.g., transmission power control), layer 2 (e.g., radio resource management, and hybrid automatic repeat request (HARQ) processing), and layer 3 (e.g., signaling regarding attachment, mobility, and call management).

For example, the digital baseband signal processing performed by the baseband processor 2403 may include signal processing in the Service Data Adaptation Protocol (SDAP) layer, Packet Data Convergence Protocol (PDCP) layer, Radio Link Control (RLC) layer, MAC layer, and PHY layer. The control-plane processing performed by the baseband processor 2403 may also include processing of Non-Access Stratum (NAS) protocols, RRC protocols, and MAC CEs.

The baseband processor 2403 may perform MIMO encoding and precoding for beamforming.

The baseband processor 2403 may include a modem processor (e.g., DSP) that performs the digital baseband signal processing and a protocol stack processor (e.g., CPU or MPU) that performs the control-plane processing. In this case, the protocol stack processor performing the control-plane processing may be integrated with an application processor 2404 described later.

The application processor 2404 may also be referred to as a CPU, an MPU, a microprocessor, or a processor core. The application processor 2404 may include a plurality of processors (processor cores). The application processor 2404 loads a system software program (Operating System (OS)) and various application programs (e.g., a voice call application, a web browser, a mailer, a camera operation application, a music player application) from a memory 2406 or from another memory (not shown) and executes these programs, thereby providing various functions of the UE 3.

In some implementations, as represented by the dashed line (2405) in FIG. 24, the baseband processor 2403 and the application processor 2404 may be integrated on a single chip. In other words, the baseband processor 2403 and the application processor 2404 may be implemented in a single System on Chip (SoC) device 2405. A SoC device may be referred to as a system Large Scale Integration (LSI) or a chipset.

The memory 2406 is a volatile memory or a non-volatile memory, or a combination thereof. The memory 2406 may include a plurality of physically independent memory devices. The volatile memory is, for example, SRAM, DRAM, or a combination thereof. The non-volatile memory may be MROM, an EEPROM, a flash memory, a hard disk drive, or any combination thereof. The memory 2406 may include, for example, an external memory device that can be accessed by the baseband processor 2403, the application processor 2404, or the SoC 2405. The memory 2406 may include an internal memory device that is integrated into the baseband processor 2403, the application processor 2404, or the SoC 2405. Further, the memory 2406 may include a memory in a Universal Integrated Circuit Card (UICC).

The memory 2406 may store one or more software modules (computer programs) 2407 including instructions and data for processing by the UE 3 described in the above example embodiments. In some implementations, the baseband processor 2403 or the application processor 2404 may load the software module(s) 2407 from the memory 2406 and execute the loaded software module(s) 2407, thereby performing the processing of the UE 3 described in the above example embodiments with reference to the drawings.

The control-plane processing and operations performed by the UE 3 described in the above embodiments can be achieved by elements other than the RF transceiver 2401 and the antenna array 2402, i.e., achieved by the memory 2406, which stores the software modules 2407, and one or both of the baseband processor 2403 and the application processor 2404.

As described using FIGS. 23 and 24, each of the processors in the MN 1, SN 2, and UE 3 according to the example embodiments described above can execute one or more programs, containing a set of instructions, to cause a computer to perform an algorithm described with reference to the drawings. Each of these programs contains a set of instructions (or software codes) that, when loaded into a computer, causes the computer to perform one or more of the functions described in the example embodiments. Each of these programs may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray (registered mark) disc or other optical disk storage, magnetic cassettes, magnetic tape, magnetic disk storage or other magnetic storage devices. Each program may be transmitted on a transitory computer readable medium or a communication medium. By way of example, and not limitation, transitory computer readable media or communication media can include electrical, optical, acoustical, or other form of propagated signals.

Oher Example Embodiments

In the example embodiments described above, each of the MN 1 and SN 2 can be configured with a CU/DU split in a C-RAN deployment. For example, a DU may receive a request for SCG activation from the UE 3, and the DU may decide whether to allow the SCG activation and notify the CU of its decision. Alternatively, a DU may notify the CU that it has received a request for SCG activation from the UE 3, and the CU may decide whether to allow the SCG activation and notify the DU of its decision.

In one or more of the example embodiments described above, the SN 2 (or the MN 1) that receives a request for SCG activation from the UE 3 can send a second signal indicating SCG activation to the UE 3 without waiting for the confirmation (or acceptance) from the MN 1 (or the SN 2). In contrast, when the MN 1 (or the SN 2) sends a request for SCG activation to the SN 2 (or the MN 1) without (or independently of) receiving a request for SCG activation from the UE 3, it may wait for the confirmation (or acceptance) from the SN 2 (or the MN 1), and after the confirmation (or acceptance) from the SN 2 (or the MN 1), it may send a second signal indicating the SCG activation to the UE 3. Alternatively, the MN 1 (or the SN 2) may send an SCG activation instruction to the UE 3 without waiting for the confirmation (or acceptance) of the SN 2 (or the MN 1), if a given conditions is met. The given condition may be that the SN 2 (or the MN 1) has previously notified the MN 1 (or the SN 2) of the permission (or authorization). Additionally or alternatively, the given condition may be the occurrence of downlink data on a bearer (or SCG DRB) using only SCG resources or on a split bearer (or split DRB) whose primary path is configured in the SCG. In the above example embodiments, the given condition may be that a request for SCG activation has been received from the UE 3. In this way, if the given condition is met, the MN 1 (or the SN 2) may send an indication of SCG activation or a signal indicating SCG activation to the UE 3 without waiting for the confirmation (or acceptance) from the SN 2 (or the MN 1).

In one or more of the example embodiments described above, the SN 2 (or the MN 1) can perform SCG activation in response to a request for SCG activation by the UE 3, without waiting for the confirmation (or acceptance) from the MN 1 (or the SN 2). In this case, the SN 2 (or MN 1) may use an indication of SCG activation or a signal indicating SCG activation to the UE 3 to send an uplink grant for the actual transmission of uplink data. The UE 3 transmits the uplink data according to the uplink grant. Alternatively, the SN 2 (or the MN 1) may send the uplink grant after the confirmation (or acceptance) from the MN 1 (or the SN 2). The uplink data may be data in an SCG DRB (or SCG bearer).

In one or more of the example embodiments described above, the UE 3 can perform a request for SCG activation (to the SN 2) by making a random access. This random access may be a CFRA or CBRA based on a 4-step random access procedure (4-step RACH). Alternatively, the random access may be a CFRA or CBRA based on a 2-step random access procedure (2-step RACH). For example, if the UE 3 uses a 2-step random access (e.g., 2-step RACH), the data part of the first message (MsgA) may contain the terminal identifier (e.g., C-RNTI) of the UE 3 in the SCG and information indicating that this first message is a request for SCG activation. This allows the SN 2 to detect which UE is requesting SCG activation by receiving the first message. Additionally or alternatively, the UE 3 may transmit either or both the amount of uplink data to be transmitted (or buffer amount) and the uplink data itself in the data part of the first message. The uplink data may be data in an SCG DRB (or SCG bearer).

In one or more of the example embodiments described above, the UE 3 can send a request for SCG activation to the SN 2 via a random access or an uplink control channel (e.g., SR, PUCCH). However, there may be cases where the SCG activation request fails (i.e., it ends in failure). In this case, the UE 3 may send a request for SCG activation to the MN 1. This may be sent in a random access or in an uplink control channel. Alternatively, the UE 3 may consider the failure of the request for SCG activation to the SN 2 as an SCG radio link disconnection (or SCG RLF) and send SCG failure information to the MN 1. In another scenario, it is possible that the UE 3 receives an indication of SCG activation from the SN 2 or MN 1 before the SCG activation request to the SN 2 or MN 1 has been successfully completed. In this case, the UE 3 may suspend the SCG activation request procedure initiated by itself and activate the SCG according to the received SCG activation indication.

Further, the above-described example embodiments are merely examples of applications of the technical ideas obtained by the inventors. These technical ideas are not limited to the above-described example embodiments and various modifications can be made thereto.

For example, the whole or part of the example embodiments disclosed above can be described as, but not limited to, the following supplementary notes.

(Supplementary Note 1)

A Radio Access Network (RAN) node configured to operate as a secondary node associated with a Secondary Cell Group (SCG) in dual connectivity for a User Equipment (UE), the RAN node comprising:

- at least one memory; and
- at least one processor coupled to the at least one memory and configured to:
  - receive a first signal indicating a request or indication of activation of the SCG from the UE via a Primary SCG Cell (PSCell) of the SCG while the SCG is deactivated;
  - transmit a second signal indicating activation of the SCG to the UE via the PSCell in response to receiving the first signal; and
  - send an inter-node message indicating activation of the SCG to a master node associated with a Master Cell Group (MCG) of the dual connectivity,
- wherein the second signal is transmitted to the UE before the secondary node sends the inter-node message to the master node or before the secondary node receives a response to the inter-node message from the master node.

(Supplementary Note 2)

The RAN node according to Supplementary Note 1, wherein the at least one processor is configured to transmit the second signal to the UE before sending the inter-node message to the master node.

(Supplementary Note 3)

The RAN node according to Supplementary Note 1 or 2, wherein the inter-node message includes information indicating that the SCG has already been activated or that activation of the SCG has been indicated to the UE.

(Supplementary Note 4)

The RAN node according to any one of Supplementary Notes 1 to 3, wherein the inter-node message is identical to a message sent from the secondary node to the master node when activation of the SCG is initiated by the secondary node, but contains information indicating SCG activation initiated by the UE.

(Supplementary Note 5)

The RAN node according to any one of Supplementary Notes 1 to 3, wherein the at least one processor is configured to:

- receive the first signal via a random access procedure to the PSCell performed by the UE or via an uplink physical layer message; and
- transmit the second signal to the UE via the random access procedure or via a downlink physical layer message.

(Supplementary Note 6)

The RAN node according to Supplementary Note 5, wherein the second signal is a random access response and implicitly indicates activation of the SCG.

(Supplementary Note 7)

The RAN node according to Supplementary Note 5, wherein the second signal is an uplink grant.

(Supplementary Note 8)

The RAN node according to any one of Supplementary Notes 1 to 7, wherein the at least one processor is configured to determine which of a plurality of options is used to activate the SCG, wherein the plurality of options includes a first option in which the secondary node transmits the second signal to the UE before sending the inter-node message to the master node, and a second option in which the secondary node transmits the second signal to the UE after receiving the response to the inter-node message from the master node.

(Supplementary Note 9)

The RAN node according to Supplementary Note 8, wherein the at least one processor is configured to determine which of the first and second options is used based on a priority level or urgency level of uplink transmission by the UE.

(Supplementary Note 10)

The RAN node according to Supplementary Note 8, wherein the first signal indicates the priority level or the urgency level.

(Supplementary Note 11)

The RAN node according to any one of Supplementary Notes 8 to 10, wherein the inter-node message contains information indicating which of the first and second options is being used.

(Supplementary Note 12)

The RAN node according to any one of Supplementary Notes 1 to 11, wherein the at least one processor is configured to configure the UE with a random access preamble pool dedicated to SCG activation, wherein the random access preamble pool is used by one or more UEs to perform a contention-based random access to the PSCell for SCG activation.

(Supplementary Note 13)

The RAN node according to any one of Supplementary Notes 1 to 11, wherein the at least one processor is configured to transmit a random access prioritization configuration to the UE if the SCG is currently deactivated or to be deactivated, wherein the random access prioritization configuration causes the UE to set a power ramping factor or a scaling factor for a backoff indicator, or both, to a value indicated by the random access prioritization configuration, if a random access procedure is initiated to activate the SCG and the random access prioritization configuration has been configured in the UE by the secondary node.

(Supplementary Note 14)

A method performed by a Radio Access Network (RAN) node configured to operate as a secondary node associated with a Secondary Cell Group (SCG) in dual connectivity for a User Equipment (UE), the method comprising:

receiving a first signal indicating a request or indication of activation of the SCG from the UE via a Primary SCG Cell (PSCell) of the SCG while the SCG is deactivated;

transmitting a second signal indicating activation of the SCG to the UE via the PSCell in response to receiving the first signal; and sending an inter-node message indicating activation of the SCG to a master node associated with a Master Cell Group (MCG) of the dual connectivity, wherein the second signal is transmitted to the UE before the secondary node sends the inter-node message to the master node or before the secondary node receives a response to the inter-node message from the master node.

(Supplementary Note 15)

A program for causing a computer to perform a method for a Radio Access Network (RAN) node configured to operate as a secondary node associated with a Secondary Cell Group (SCG) in dual connectivity for a User Equipment (UE), the method comprising:

receiving a first signal indicating a request or indication of activation of the SCG from the UE via a Primary SCG Cell (PSCell) of the SCG while the SCG is deactivated;

transmitting a second signal indicating activation of the SCG to the UE via the PSCell in response to receiving the first signal; and sending an inter-node message indicating activation of the SCG to a master node associated with a Master Cell Group (MCG) of the dual connectivity, wherein the second signal is transmitted to the UE before the secondary node sends the inter-node message to the master node or before the secondary node receives a response to the inter-node message from the master node.

(Supplementary Note 16)

A Radio Access Network (RAN) node configured to operate as a secondary node associated with a Secondary Cell Group (SCG) in dual connectivity for a User Equipment (UE), the RAN node comprising:

at least one memory; and at least one processor coupled to the at least one memory and configured to:

receive a first signal indicating a request or indication of activation of the SCG from the UE via a Primary SCG Cell (PSCell) of the SCG while the SCG is deactivated;

in response to receiving the first signal, send an inter-node message indicating activation of the SCG to a master node associated with a Master Cell Group (MCG) of the dual connectivity;

receive a response to the inter-node message from the master node; and if the response indicates that the activation of the SCG is accepted, transmit a second signal indicating the activation of the SCG to the UE via the PSCell.

(Supplementary Note 17)

The RAN node according to Supplementary Note 16, wherein the inter-node message is identical to a message sent from the secondary node to the master node when activation of the SCG is initiated by the secondary node, but contains information indicating SCG activation initiated by the UE.

(Supplementary Note 18)

The RAN node according to Supplementary Note 16 or 17, wherein the at least one processor is configured to determine which of a plurality of options is used to activate the SCG, wherein the plurality of options includes a first option in which the secondary node transmits the second signal to the UE before sending the inter-node message to the master node, and a second option in which the secondary node transmits the second signal to the UE after receiving the response to the inter-node message from the master node.

(Supplementary Note 19)

The RAN node according to Supplementary Note 18, wherein the inter-node message contains information indicating which of the first and second options is being used.

(Supplementary Note 20)

A method performed by a Radio Access Network (RAN) node configured to operate as a secondary node associated with a Secondary Cell Group (SCG) in dual connectivity for a User Equipment (UE), the method comprising:

receiving a first signal indicating a request or indication of activation of the SCG from the UE via a Primary SCG Cell (PSCell) of the SCG while the SCG is deactivated;

in response to receiving the first signal, sending an inter-node message indicating activation of the SCG to a master node associated with a Master Cell Group (MCG) of the dual connectivity;

receiving a response to the inter-node message from the master node; and if the response indicates that the activation of the SCG is accepted, transmitting a second signal indicating the activation of the SCG to the UE via the PSCell.

(Supplementary Note 21)

A program for causing a computer to perform a method for a Radio Access Network (RAN) node configured to operate as a secondary node associated with a Secondary Cell Group (SCG) in dual connectivity for a User Equipment (UE), the method comprising:

receiving a first signal indicating a request or indication of activation of the SCG from the UE via a Primary SCG Cell (PSCell) of the SCG while the SCG is deactivated;

in response to receiving the first signal, sending an inter-node message indicating activation of the SCG to a master node associated with a Master Cell Group (MCG) of the dual connectivity;

receiving a response to the inter-node message from the master node; and if the response indicates that the activation of the SCG is accepted, transmitting a second signal indicating the activation of the SCG to the UE via the PSCell.

(Supplementary Note 22)

A Radio Access Network (RAN) node configured to operate as a secondary node associated with a Secondary Cell Group (SCG) in dual connectivity for a User Equipment (UE), the RAN node comprising:

at least one memory; and at least one processor coupled to the at least one memory and configured to determine which of a plurality of options is used to activate the SCG, wherein the plurality of options are used to activate the SCG in response to receipt of a first signal indicating a request or indication of activation of the SCG from the UE via a Primary SCG Cell (PSCell) of the SCG, the plurality of options includes a first option and a second option, the first option is an option in which the secondary node transmits a second signal indicating the activation of the SCG to the UE via the PSCell before sending an inter-node message indicating the activation of the SCG to a master node associated with a Master Cell Group (MCG) of the dual connectivity, and the second option is an option in which the secondary node transmits the second signal to the UE after receiving a response to the inter-node message from the master node.

(Supplementary Note 23)

The RAN node according to Supplementary Note 22, wherein the at least one processor is configured to determine which of the first and second options is used based on a priority level or urgency level of uplink transmission by the UE.

(Supplementary Note 24)

The RAN node according to Supplementary Note 23, wherein the first signal indicates the priority level or the urgency level.

(Supplementary Note 25)

The RAN node according to any one of Supplementary Notes 22 to 24, wherein the inter-node message contains information indicating which of the first and second options is being used.

(Supplementary Note 26)

A method performed by a Radio Access Network (RAN) node configured to operate as a secondary node associated with a Secondary Cell Group (SCG) in dual connectivity for a User Equipment (UE), the method comprising:

determining which of a plurality of options is used to activate the SCG, wherein the plurality of options are used to activate the SCG in response to receipt of a first signal indicating a request or indication of activation of the SCG from the UE via a Primary SCG Cell (PSCell) of the SCG, the plurality of options includes a first option and a second option, the first option is an option in which the secondary node transmits a second signal indicating the activation of the SCG to the UE via the PSCell before sending an inter-node message indicating the activation of the SCG to a master node associated with a Master Cell Group (MCG) of the dual connectivity, and the second option is an option in which the secondary node transmits the second signal to the UE after receiving a response to the inter-node message from the master node.

(Supplementary Note 27)

A program for causing a computer to perform a method for a Radio Access Network (RAN) node configured to operate as a secondary node associated with a Secondary Cell Group (SCG) in dual connectivity for a User Equipment (UE), the method comprising:

determining which of a plurality of options is used to activate the SCG, wherein the plurality of options are used to activate the SCG in response to receipt of a first signal indicating a request or indication of activation of the SCG from the UE via a Primary SCG Cell (PSCell) of the SCG, the plurality of options includes a first option and a second option, the first option is an option in which the secondary node transmits a second signal indicating the activation of the SCG to the UE via the PSCell before sending an inter-node message indicating the activation of the SCG to a master node associated with a Master Cell Group (MCG) of the dual connectivity, and the second option is an option in which the secondary node transmits the second signal to the UE after receiving a response to the inter-node message from the master node.

(Supplementary Note 28)

A Radio Access Network (RAN) node configured to operate as a master node associated with a Master Cell Group (MCG) in dual connectivity for a User Equipment (UE), the RAN node comprising:

at least one memory; and at least one processor coupled to the at least one memory and configured to determine which of a plurality of options is used to activate a Secondary Cell Group (SCG) of the dual connectivity, wherein the plurality of options are used to activate the SCG in response to receipt of a first signal indicating a request or indication of activation of the SCG from the UE via the MCG, the plurality of options includes a first option and a second option, the first option is an option in which the master node transmits a second signal indicating the activation of the SCG to the UE via the MCG before sending an inter-node message indicating the activation of the SCG to a secondary node associated with the SCG, and the second option is an option in which the master node transmits the second signal to the UE after receiving a response to the inter-node message from the secondary node.

(Supplementary Note 29)

The RAN node according to Supplementary Note 28, wherein the at least one processor is configured to determine which of the first and second options is used based on a priority level or urgency level of uplink transmission by the UE.

(Supplementary Note 30)

The RAN node according to Supplementary Note 29, wherein the first signal indicates the priority level or the urgency level.

(Supplementary Note 31)

The RAN node according to any one of Supplementary Notes 28 to 30, wherein the inter-node message contains information indicating which of the first and second options is being used.

(Supplementary Note 32)

A method performed by a Radio Access Network (RAN) node configured to operate as a master node associated with a Master Cell Group (MCG) in dual connectivity for a User Equipment (UE), the method comprising:

determining which of a plurality of options is used to activate a Secondary Cell Group (SCG) of the dual connectivity, wherein the plurality of options are used to activate the SCG in response to receipt of a first signal indicating a request or indication of activation of the SCG from the UE via the MCG, the plurality of options includes a first option and a second option, the first option is an option in which the master node transmits a second signal indicating the activation of the SCG to the UE via the MCG before sending an inter-node message indicating the activation of the SCG to a secondary node associated with the SCG, and the second option is an option in which the master node transmits the second signal to the UE after receiving a response to the inter-node message from the secondary node.

(Supplementary Note 33)

A program for causing a computer to perform a method for a Radio Access Network (RAN) node configured to operate as a master node associated with a Master Cell Group (MCG) in dual connectivity for a User Equipment (UE), the method comprising:

determining which of a plurality of options is used to activate a Secondary Cell Group (SCG) of the dual connectivity, wherein the plurality of options are used to activate the SCG in response to receipt of a first signal indicating a request or indication of activation of the SCG from the UE via the MCG, the plurality of options includes a first option and a second option, the first option is an option in which the master node transmits a second signal indicating the activation of the SCG to the UE via the MCG before sending an inter-node message indicating the activation of the SCG to a secondary node associated with the SCG, and the second option is an option in which the master node transmits the second signal to the UE after receiving a response to the inter-node message from the secondary node.

(Supplementary Note 34)

A Radio Access Network (RAN) node configured to operate as a secondary node associated with a Secondary Cell Group (SCG) in dual connectivity for a User Equipment (UE), the RAN node comprising:

at least one memory; and at least one processor coupled to the at least one memory and configured to:

receive a first signal indicating a request or indication of activation of the SCG from the UE via a Primary SCG Cell (PSCell) of the SCG while the SCG is deactivated; and in response to receiving the first signal, send an inter-node message indicating a request or indication of activation of the SCG to a master node associated with a Master Cell Group (MCG) of the dual connectivity, wherein the inter-node message is identical to a message sent from the secondary node to the master node when activation of the SCG is initiated by the secondary node, but contains information indicating SCG activation initiated by the UE.

(Supplementary Note 35)

A method performed by a Radio Access Network (RAN) node configured to operate as a secondary node associated with a Secondary Cell Group (SCG) in dual connectivity for a User Equipment (UE), the method comprising:

receiving a first signal indicating a request or indication of activation of the SCG from the UE via a Primary SCG Cell (PSCell) of the SCG while the SCG is deactivated; and in response to receiving the first signal, sending an inter-node message indicating a request or indication of activation of the SCG to a master node associated with a Master Cell Group (MCG) of the dual connectivity, wherein the inter-node message is identical to a message sent from the secondary node to the master node when activation of the SCG is initiated by the secondary node, but contains information indicating SCG activation initiated by the UE.

(Supplementary Note 36)

A program for causing a computer to perform a method for a Radio Access Network (RAN) node configured to operate as a secondary node associated with a Secondary Cell Group (SCG) in dual connectivity for a User Equipment (UE), the method comprising:

receiving a first signal indicating a request or indication of activation of the SCG from the UE via a Primary SCG Cell (PSCell) of the SCG while the SCG is deactivated; and in response to receiving the first signal, sending an inter-node message indicating a request or indication of activation of the SCG to a master node associated with a Master Cell Group (MCG) of the dual connectivity, wherein the inter-node message is identical to a message sent from the secondary node to the master node when activation of the SCG is initiated by the secondary node, but contains information indicating SCG activation initiated by the UE.

(Supplementary Note 37)

A Radio Access Network (RAN) node configured to operate as a master node associated with a Master Cell Group (MCG) in dual connectivity for a User Equipment (UE), the RAN node comprising:

at least one memory; and at least one processor coupled to the at least one memory and configured to:

while a Secondary Cell Group (SCG) of the dual connectivity is deactivated, receive a first signal indicating a request or indication of activation of the SCG from the UE via the MCG; and in response to receiving the first signal, send an inter-node message indicating a request or indication of activation of the SCG to a secondary node associated with the SCG, wherein the inter-node message is identical to a message sent from the master node to the secondary node when activation of the SCG is initiated by the master node, but contains information indicating SCG activation initiated by the UE.

(Supplementary Note 38)

A method performed by a Radio Access Network (RAN) node configured to operate as a master node associated with a Master Cell Group (MCG) in dual connectivity for a User Equipment (UE), the method comprising:

while a Secondary Cell Group (SCG) of the dual connectivity is deactivated, receiving a first signal indicating a request or indication of activation of the SCG from the UE via the MCG; and in response to receiving the first signal, sending an inter-node message indicating a request or indication of activation of the SCG to a secondary node associated with the SCG, wherein the inter-node message is identical to a message sent from the master node to the secondary node when activation of the SCG is initiated by the master node, but contains information indicating SCG activation initiated by the UE.

(Supplementary Note 39)

A program for causing a computer to perform a method for a Radio Access Network (RAN) node configured to operate as a master node associated with a Master Cell Group (MCG) in dual connectivity for a User Equipment (UE), the method comprising:

while a Secondary Cell Group (SCG) of the dual connectivity is deactivated, receiving a first signal indicating a request or indication of activation of the SCG from the UE via the MCG; and in response to receiving the first signal, sending an inter-node message indicating a request or indication of activation of the SCG to a secondary node associated with the SCG, wherein the inter-node message is identical to a message sent from the master node to the secondary node when activation of the SCG is initiated by the master node, but contains information indicating SCG activation initiated by the UE.

(Supplementary Note 40)

A Radio Access Network (RAN) node configured to operate as a secondary node associated with a Secondary Cell Group (SCG) in dual connectivity for a User Equipment (UE), the RAN node comprising:

at least one memory; and at least one processor coupled to the at least one memory and configured to determine which of a plurality of options is used to activate the SCG, wherein receive a first signal indicating a request or indication of activation of the SCG from the UE via a Primary SCG Cell (PSCell) of the SCG while the SCG is deactivated; and in response to receiving the first signal, send an inter-node message indicating a request or indication of activation of the SCG to a master node associated with a Master Cell Group (MCG) of the dual connectivity, wherein the inter-node message contains information indicating which of first and second options is used to activate the SCG, the first option is an option in which the secondary node transmits a second signal indicating the activation of the SCG to the UE via the PSCell before sending the inter-node message to the master node, and the second option is an option in which the secondary node transmits the second signal to the UE after receiving a response to the inter-node message from the master node.

(Supplementary Note 41)

A method performed by a Radio Access Network (RAN) node configured to operate as a secondary node associated with a Secondary Cell Group (SCG) in dual connectivity for a User Equipment (UE), the method comprising:

receiving a first signal indicating a request or indication of activation of the SCG from the UE via a Primary SCG Cell (PSCell) of the SCG while the SCG is deactivated; and in response to receiving the first signal, sending an inter-node message indicating a request or indication of activation of the SCG to a master node associated with a Master Cell Group (MCG) of the dual connectivity, wherein the inter-node message contains information indicating which of first and second options is used to activate the SCG, the first option is an option in which the secondary node transmits a second signal indicating the activation of the SCG to the UE via the PSCell before sending the inter-node message to the master node, and the second option is an option in which the secondary node transmits the second signal to the UE after receiving a response to the inter-node message from the master node.

(Supplementary Note 42)

A program for causing a computer to perform a method for a Radio Access Network (RAN) node configured to operate as a secondary node associated with a Secondary Cell Group (SCG) in dual connectivity for a User Equipment (UE), the method comprising:

receiving a first signal indicating a request or indication of activation of the SCG from the UE via a Primary SCG Cell (PSCell) of the SCG while the SCG is deactivated; and in response to receiving the first signal, sending an inter-node message indicating a request or indication of activation of the SCG to a master node associated with a Master Cell Group (MCG) of the dual connectivity, wherein the inter-node message contains information indicating which of first and second options is used to activate the SCG, the first option is an option in which the secondary node transmits a second signal indicating the activation of the SCG to the UE via the PSCell before sending the inter-node message to the master node, and the second option is an option in which the secondary node transmits the second signal to the UE after receiving a response to the inter-node message from the master node.

(Supplementary Note 43)

A Radio Access Network (RAN) node configured to operate as a master node associated with a Master Cell Group (MCG) in dual connectivity for a User Equipment (UE), the RAN node comprising:

at least one memory; and at least one processor coupled to the at least one memory and configured to:

while a Secondary Cell Group (SCG) of the dual connectivity is deactivated, receive a first signal indicating a request or indication of activation of the SCG from the UE via the MCG; and in response to receiving the first signal, send an inter-node message indicating a request or indication of activation of the SCG to a secondary node associated with the SCG, wherein the inter-node message contains information indicating which of first and second options is used to activate the SCG, the first option is an option in which the master node transmits a second signal indicating the activation of the SCG to the UE via the MCG before sending the inter-node message to the secondary node, and the second option is an option in which the master node transmits the second signal to the UE after receiving a response to the inter-node message from the secondary node.

(Supplementary Note 44)

A method performed by a Radio Access Network (RAN) node configured to operate as a master node associated with a Master Cell Group (MCG) in dual connectivity for a User Equipment (UE), the method comprising:

while a Secondary Cell Group (SCG) of the dual connectivity is deactivated, receiving a first signal indicating a request or indication of activation of the SCG from the UE via the MCG; and in response to receiving the first signal, sending an inter-node message indicating a request or indication of activation of the SCG to a secondary node associated with the SCG, wherein the inter-node message contains information indicating which of first and second options is used to activate the SCG, the first option is an option in which the master node transmits a second signal indicating the activation of the SCG to the UE via the MCG before sending the inter-node message to the secondary node, and the second option is an option in which the master node transmits the second signal to the UE after receiving a response to the inter-node message from the secondary node.

(Supplementary Note 45)

A program for causing a computer to perform a method for a Radio Access Network (RAN) node configured to operate as a master node associated with a Master Cell Group (MCG) in dual connectivity for a User Equipment (UE), the method comprising:

while a Secondary Cell Group (SCG) of the dual connectivity is deactivated, receiving a first signal indicating a request or indication of activation of the SCG from the UE via the MCG; and in response to receiving the first signal, sending an inter-node message indicating a request or indication of activation of the SCG to a secondary node associated with the SCG, wherein the inter-node message contains information indicating which of first and second options is used to activate the SCG, the first option is an option in which the master node transmits a second signal indicating the activation of the SCG to the UE via the MCG before sending the inter-node message to the secondary node, and the second option is an option in which the master node transmits the second signal to the UE after receiving a response to the inter-node message from the secondary node.

(Supplementary Note 46)

A Radio Access Network (RAN) node configured to operate as a secondary node associated with a Secondary Cell Group (SCG) in dual connectivity for a User Equipment (UE), the RAN node comprising:

at least one memory; and at least one processor coupled to the at least one memory and configured to configure the UE with a random access preamble pool dedicated to SCG activation, wherein the random access preamble pool is used by one or more UEs to perform a contention-based random access to a Primary SCG Cell (PSCell) of the SCG for SCG activation.

(Supplementary Note 47)

A method performed by a Radio Access Network (RAN) node configured to operate as a secondary node associated with a Secondary Cell Group (SCG) in dual connectivity for a User Equipment (UE), the method comprising:

configuring the UE with a random access preamble pool dedicated to SCG activation, wherein the random access preamble pool is used by one or more UEs to perform a contention-based random access to a Primary SCG Cell (PSCell) of the SCG for SCG activation.

(Supplementary Note 48)

A program for causing a computer to perform a method for a Radio Access Network (RAN) node configured to operate as a secondary node associated with a Secondary Cell Group (SCG) in dual connectivity for a User Equipment (UE), the method comprising:

configuring the UE with a random access preamble pool dedicated to SCG activation, wherein the random access preamble pool is used by one or more UEs to perform a contention-based random access to a Primary SCG Cell (PSCell) of the SCG for SCG activation.

(Supplementary Note 49)

A User Equipment (UE) configured to support dual connectivity using a Master Cell Group (MCG) associated with a master node and a Secondary Cell Group (SCG) associated with a secondary node, the UE comprising:

at least one memory; and
at least one processor coupled to the at least one memory and configured to:
receive from the secondary node a configuration of a random access preamble pool dedicated to SCG activation; and
select a preamble from the random access preamble pool to perform a contention-based random access to a Primary SCG Cell (PSCell) of the SCG to activate the SCG.

(Supplementary Note 50)

A method performed by a User Equipment (UE) configured to support dual connectivity using a Master Cell Group (MCG) associated with a master node and a Secondary Cell Group (SCG) associated with a secondary node, the method comprising:
receiving from the secondary node a configuration of a random access preamble pool dedicated to SCG activation; and
selecting a preamble from the random access preamble pool to perform a contention-based random access to a Primary SCG Cell (PSCell) of the SCG to activate the SCG.

(Supplementary Note 51)

A program for causing a computer to perform a method for a User Equipment (UE) configured to support dual connectivity using a Master Cell Group (MCG) associated with a master node and a Secondary Cell Group (SCG) associated with a secondary node, the method comprising:
receiving from the secondary node a configuration of a random access preamble pool dedicated to SCG activation; and
selecting a preamble from the random access preamble pool to perform a contention-based random access to a Primary SCG Cell (PSCell) of the SCG to activate the SCG.

(Supplementary Note 52)

A Radio Access Network (RAN) node configured to operate as a secondary node associated with a Secondary Cell Group (SCG) in dual connectivity for a User Equipment (UE), the RAN node comprising:
at least one memory; and
at least one processor coupled to the at least one memory and configured to transmit a random access prioritization configuration to the UE if the SCG is currently deactivated or to be deactivated,
wherein the random access prioritization configuration causes the UE to set a power ramping factor or a scaling factor for a backoff indicator, or both, to a value indicated by the random access prioritization configuration, if a random access procedure is initiated to activate the SCG and the random access prioritization configuration has been configured in the UE by the secondary node.

(Supplementary Note 53)

A method performed by a Radio Access Network (RAN) node configured to operate as a secondary node associated with a Secondary Cell Group (SCG) in dual connectivity for a User Equipment (UE), the method comprising:
transmitting a random access prioritization configuration to the UE if the SCG is currently deactivated or to be deactivated,
wherein the random access prioritization configuration causes the UE to set a power ramping factor or a scaling factor for a backoff indicator, or both, to a value indicated by the random access prioritization configuration, if a random access procedure is initiated to activate the SCG and the random access prioritization configuration has been configured in the UE by the secondary node.

(Supplementary Note 54)

A program for causing a computer to perform a method for a Radio Access Network (RAN) node configured to operate as a secondary node associated with a Secondary Cell Group (SCG) in dual connectivity for a User Equipment (UE), the method comprising:
transmitting a random access prioritization configuration to the UE if the SCG is currently deactivated or to be deactivated,
wherein the random access prioritization configuration causes the UE to set a power ramping factor or a scaling factor for a backoff indicator, or both, to a value indicated by the random access prioritization configuration, if a random access procedure is initiated to activate the SCG and the random access prioritization configuration has been configured in the UE by the secondary node.

(Supplementary Note 55)

A User Equipment (UE) configured to support dual connectivity using a Master Cell Group (MCG) associated with a master node and a Secondary Cell Group (SCG) associated with a secondary node, the UE comprising:
at least one memory; and
at least one processor coupled to the at least one memory and configured to:
if a random access procedure is initiated to activate the SCG and a random access prioritization configuration has been configured in the UE by the secondary node, set a power ramping factor or a scaling factor for a backoff indicator, or both, to a value indicated by the random access prioritization configuration; and
perform a random access to a Primary SCG Cell (PSCell) of the SCG.

(Supplementary Note 56)

A method performed by a User Equipment (UE) configured to support dual connectivity using a Master Cell Group (MCG) associated with a master node and a Secondary Cell Group (SCG) associated with a secondary node, the method comprising:
if a random access procedure is initiated to activate the SCG and a random access prioritization configuration has been configured in the UE by the secondary node, setting a power ramping factor or a scaling factor for a backoff indicator, or both, to a value indicated by the random access prioritization configuration; and
performing a random access to a Primary SCG Cell (PSCell) of the SCG.

(Supplementary Note 57)

A program for causing a computer to perform a method for a User Equipment (UE) configured to support dual connectivity using a Master Cell Group (MCG) associated with a master node and a Secondary Cell Group (SCG) associated with a secondary node, the method comprising:
if a random access procedure is initiated to activate the SCG and a random access prioritization configuration has been configured in the UE by the secondary node, setting a power ramping factor or a scaling factor for a backoff indicator, or both, to a value indicated by the random access prioritization configuration; and
performing a random access to a Primary SCG Cell (PSCell) of the SCG.

This application is based upon and claims the benefit of priority from Japanese Patent Application No. 2021-116353, filed on Jul. 14, 2021, the disclosure of which is incorporated herein in its entirety by reference.

REFERENCE SIGNS LIST

1 Master Node (MN)
2 Secondary Node (SN)
3 User Equipment (UE)
2304 Processor
2305 Memory
2306 Modules
2403 Baseband Processor
2404 Application Processor
2406 Memory
2407 Modules

What is claimed is:

1. A Radio Access Network (RAN) node configured to operate as a secondary node associated with a Secondary Cell Group (SCG) in dual connectivity for a User Equipment (UE), the RAN node comprising:
- at least one memory; and
- at least one processor coupled to the at least one memory and configured to:
  - receive a first signal indicating a request or indication of activation of the SCG from the UE via a Primary SCG Cell (PSCell) of the SCG while the SCG is deactivated;
  - transmit a second signal indicating activation of the SCG to the UE via the PSCell in response to receiving the first signal; and
  - send an inter-node message indicating activation of the SCG to a master node associated with a Master Cell Group (MCG) of the dual connectivity,
- wherein the second signal is transmitted to the UE before the secondary node sends the inter-node message to the master node or before the secondary node receives a response to the inter-node message from the master node.

2. The RAN node according to claim 1, wherein the at least one processor is configured to transmit the second signal to the UE before sending the inter-node message to the master node.

3. The RAN node according to claim 1, wherein the inter-node message includes information indicating that the SCG has already been activated or that activation of the SCG has been indicated to the UE.

4. The RAN node according to claim 1, wherein the inter-node message is identical to a message sent from the secondary node to the master node when activation of the SCG is initiated by the secondary node, but contains information indicating SCG activation initiated by the UE.

5. The RAN node according to claim 1, wherein the at least one processor is configured to:
- receive the first signal via a random access procedure to the PSCell performed by the UE or via an uplink physical layer message; and
- transmit the second signal to the UE via the random access procedure or via a downlink physical layer message.

6. The RAN node according to claim 5, wherein the second signal is a random access response and implicitly indicates activation of the SCG.

7. The RAN node according to claim 5, wherein the second signal is an uplink grant.

8. The RAN node according to claim 1, wherein the at least one processor is configured to determine which of a plurality of procedures is used to activate the SCG, and
- wherein the plurality of procedures includes a first procedure in which the secondary node transmits the second signal to the UE before sending the inter-node message to the master node, and a second procedure in which the secondary node transmits the second signal to the UE after receiving the response to the inter-node message from the master node.

9. The RAN node according to claim 8, wherein the at least one processor is configured to determine which of the first and second procedures is used based on a priority level or urgency level of uplink transmission by the UE.

10. The RAN node according to claim 8, wherein the first signal indicates the priority level or the urgency level.

11. The RAN node according to claim 8, wherein the inter-node message contains information indicating which of the first and second procedures is being used.

12. The RAN node according to claim 1, wherein the at least one processor is configured to configure the UE with a random access preamble pool dedicated to SCG activation, and
- wherein the random access preamble pool is used by one or more UEs to perform a contention-based random access to the PSCell for SCG activation.

13. The RAN node according to claim 1, wherein the at least one processor is configured to transmit a random access prioritization configuration to the UE if the SCG is currently deactivated or to be deactivated, and
- wherein the random access prioritization configuration causes the UE to set a power ramping factor or a scaling factor for a backoff indicator, or both, to a value indicated by the random access prioritization configuration, if a random access procedure is initiated to activate the SCG and the random access prioritization configuration has been configured in the UE by the secondary node.

14. A method performed by a Radio Access Network (RAN) node configured to operate as a secondary node associated with a Secondary Cell Group (SCG) in dual connectivity for a User Equipment (UE), the method comprising:
- receiving a first signal indicating a request or indication of activation of the SCG from the UE via a Primary SCG Cell (PSCell) of the SCG while the SCG is deactivated;
- transmitting a second signal indicating activation of the SCG to the UE via the PSCell in response to receiving the first signal; and
- sending an inter-node message indicating activation of the SCG to a master node associated with a Master Cell Group (MCG) of the dual connectivity,
- wherein the second signal is transmitted to the UE before the secondary node sends the inter-node message to the master node or before the secondary node receives a response to the inter-node message from the master node.

15. A non-transitory computer readable medium storing a program for causing a computer to perform a method for a Radio Access Network (RAN) node configured to operate as a secondary node associated with a Secondary Cell Group (SCG) in dual connectivity for a User Equipment (UE), the method comprising:
- receiving a first signal indicating a request or indication of activation of the SCG from the UE via a Primary SCG Cell (PSCell) of the SCG while the SCG is deactivated;
- transmitting a second signal indicating activation of the SCG to the UE via the PSCell in response to receiving the first signal; and sending an inter-node message indicating activation of the SCG to a master node associated with a Master Cell Group (MCG) of the dual connectivity, wherein the second signal is transmitted to the UE before the secondary node sends the inter-node message to the master node or before the secondary node receives a response to the inter-node message from the master node.

* * * * *